(12) United States Patent
Nishikawa et al.

(10) Patent No.: US 11,724,181 B2
(45) Date of Patent: Aug. 15, 2023

(54) NON-TRANSITORY COMPUTER READABLE MEDIUM, METHOD OF CONTROLLING A GAME, AND INFORMATION PROCESSING DEVICE

(71) Applicant: GREE, Inc., Tokyo (JP)

(72) Inventors: Tomoaki Nishikawa, Minato-ku (JP); Tomoya Yuki, Minato-ku (JP); Yuya Komaba, Minato-ku (JP)

(73) Assignee: GREE, Inc., Tokyo (JP)

( * ) Notice: Subject to any disclaimer, the term of this patent is extended or adjusted under 35 U.S.C. 154(b) by 251 days.

(21) Appl. No.: 17/238,706

(22) Filed: Apr. 23, 2021

(65) Prior Publication Data

US 2021/0236922 A1 Aug. 5, 2021

Related U.S. Application Data

(63) Continuation of application No. 16/149,945, filed on Oct. 2, 2018, now Pat. No. 11,052,312, which is a
(Continued)

(30) Foreign Application Priority Data

Sep. 16, 2015 (JP) ................................ 2015-183110
Sep. 30, 2015 (JP) ................................ 2015-194166

(51) Int. Cl.
*A63F 13/822* (2014.01)
*A63F 13/56* (2014.01)
(Continued)

(52) U.S. Cl.
CPC .......... *A63F 13/35* (2014.09); *A63F 13/5378* (2014.09); *A63F 13/56* (2014.09); *A63F 13/822* (2014.09); *A63F 13/537* (2014.09)

(58) Field of Classification Search
CPC .............................. A63F 13/56; A63F 13/822
See application file for complete search history.

(56) References Cited

U.S. PATENT DOCUMENTS 8,448,095 B1 5/2013 Haussila
8,926,428 B1 1/2015 Nakayama
(Continued)

FOREIGN PATENT DOCUMENTS

JP        H-11179048 A      7/1999
JP        2007-267825 A    10/2007
(Continued)

OTHER PUBLICATIONS

Japanese Office Action dated Jan. 11, 2022 in Japanese Patent Application No. 2018-240460 (with English translation), 11 pages.
(Continued)

*Primary Examiner* — Jay Trent Liddle
(74) *Attorney, Agent, or Firm* — Oblon, McClelland, Maier & Neustadt, L.L.P.

(57) ABSTRACT

A non-transitory computer readable medium including program instructions, a method of controlling a game, and an information processing device make a game more amusing. When executed, the program instructions cause the information processing device to store information related to objects and information related to game contents in a storage, associate positioning information in a virtual space with each object, associate positioning information with the game contents, cause the objects and the game contents to be displayed at the position indicated by the positioning information associated with each of the objects and the game contents, change the positioning information associated with an object and the positioning information associated with each game content associated with the object, determine whether a predetermined condition is satisfied, and finalize the positioning information associated with the objects and
(Continued)

the positioning information associated with the game contents when the predetermined condition is determined to be satisfied.

20 Claims, 14 Drawing Sheets

Related U.S. Application Data continuation of application No. 15/192,058, filed on Jun. 24, 2016, now abandoned.

(51) Int. Cl.
*A63F 13/35* (2014.01)
*A63F 13/5378* (2014.01)
*A63F 13/537* (2014.01)

(56) References Cited

U.S. PATENT DOCUMENTS

| | | |
|---|---|---|
| 9,814,968 B1 | 11/2017 | Kim |
| 2010/0273544 A1 | 10/2010 | Koganezawa |
| 2013/0275868 A1 | 10/2013 | Haussila |
| 2014/0143732 A1 | 5/2014 | Haussila |
| 2014/0243095 A1 | 8/2014 | Ikeda |
| 2014/0335951 A1 | 11/2014 | Matsunaga |
| 2014/0343700 A1 | 11/2014 | Soohoo |
| 2015/0105147 A1 | 4/2015 | Franzas |
| 2015/0105151 A1 | 4/2015 | Franzas |
| 2015/0297995 A1 | 10/2015 | Haussila |
| 2015/0336001 A1 | 11/2015 | Ishida |
| 2016/0139773 A1 | 5/2016 | Kodisoja |
| 2016/0256777 A1 | 9/2016 | Umebayashi |

FOREIGN PATENT DOCUMENTS

| | | |
|---|---|---|
| JP | 2008-302015 A | 12/2008 |
| JP | 2012-085736 A | 5/2012 |
| JP | 2015-104411 A | 6/2015 |

OTHER PUBLICATIONS

Japanese Office Action dated Nov. 10. 2015, issued in Japanese Patent Application No. 2015-194166 (with English translation).
Japanese Office Action dated Nov. 24, 2015, issued in Japanese Patent Application No. 2015-183110 (with English translation).
Japanese Office Action dated Jun. 21, 2016, issued in Japanese Patent Application No. 2016-065789 (with English translation).
CD1: Non Patent Document "Gekitotsu yosai!+", [online], Feb. 23, 2014. URL: https/www.youtube.com/watch?v=7Usipin7znl.
CD2: Non Patent Document "Gekitotsu yosai!+ wiki", [online], Sep. 11, 2015. URL: http//wikiwiki.jp/gekitotsu/?Unit%2F8.
CD3: Non Patent Document "Gekitotsu!+ GooglePlay", [online], Jul. 1, 2015. URL: https://play.google.com/store/apps/details?id=jp.co.cygames.gekitotsu&hl=ja.
Office Action dated May 29, 2018 in corresponding Japanese Patent Application No. 2017-022358 (with English Translation), citing documents AX-AZ therein, 9 pages.
Yajima Masaki/Enterbrain Inc., "God Eater Final Complete Guide",1st Edition, May 6, 2010, pp. 22, 35, 576 (3 pages).
Enterbrain Inc., "Rune Factory 4, Weekly FamiTsu", vol. 27, No. 31, Jul. 19, 2012, pp. 136-141.
Superjombombo, "Kingdom Rush Frontiers—Criomson Valley 3 Stars E7," published on Jun. 6, 2013, available at https://www.youtube.com/watch?v=XbCukm--IK8, last retrieved Mar. 26, 2018.
Kadokawa Corporation, "Little Noah, Weekly FamiTsu", vol. 30, No. 12, Mar. 5, 2015, pp. 160-167.
Japanese Office Action dated Oct. 27, 2020 in Japanese Patent Application No. 2018-240460 (with English machine translation), 6 pages.
Japanese Office Action dated Dec. 10, 2019, in Patent Application No. 2018-240460, citing documents AX-AY therein, 6 pages (with unedited computer generated English translation).
"chapter [of Nobunaga"s ambition Online•• corresponding to PlayStation 2 version/the personal computer version] official guide upper 8.8.27 version", incorporated company honor, ISBN: 978-4-7758-0699-9, Sep. 27, 2008, 5 pages.
"Vagrant Story", Shoji Lighten, Jan. 26, 2006, 4 pages.
Office Action dated Jun. 9, 2020 in corresponding Japanese Patent Application No. 2018-240460 (with English Translation}, 4 pages.
Battle Vortex, "Backyard Monsters—How to repair your base After an attack" available at https://www.youtube.com/watch?v=YHaGfYeMQAM, published Feb. 2, 2011, last accessed Jul. 23, 2020 (Year: 2011).
Clash of Clans Forum, available at https://forum.supercell.com/showthread.php/631292-does-your-destroyed-village-automatically-repair-itself-even-if-you-dont-log-on, ;ublished Apr. 21, 2015; last accessed, Jul. 23, 2020 (Year: 2015).
Japanese Notice of Reasons for Refusal dated Jan. 10, 2023, in Japanese Patent Application No. 2021-180111, therein, 9 pages, with English Machine Translation.
Administrative training formula perfect Guide, first edition, Shinkigensha Co., Ltd., Dec. 4, 2008, pp. 14-19, 34 and 35 to (Documents showing well-known arts).
Final Notification of Reason(s) for Refusal dated Jun. 27, 2023 in corresponding Japanese patent application No. 2021-180111 (with English translation)(6 pages).
DS Touch and Direct Playing Manual, first Edition, Inc., Dec. 2, 2008, p. 14, pp. 17 to 25 Hamamura (7 pages).
Prediction of the omission of US & Bruum-Charles and Mekami, vol. 9, No. 6, pp. 54-61, MediaWorks PlayStation Feb. 28, 2003 (10 pages).

FIG. 2

| User ID | Information related to objects | Information related to first game contents | Information related to second game contents |
|---|---|---|---|
| user001 | **** | **** | **** |
| user002 | **** | **** | **** |
| ⋮ | ⋮ | ⋮ | ⋮ |

FIG. 3

| Object ID | Shape data | Connection position information | Cost | First placement information | Condition completed flag | Finalized flag |
|---|---|---|---|---|---|---|
| object001 | **** | **** | **** | **** | **** | **** |
| object002 | **** | **** | **** | **** | **** | **** |
| ⋮ | ⋮ | ⋮ | ⋮ | ⋮ | ⋮ | ⋮ |

FIG. 4

| First game content ID | Intra-object placement information | Game parameters | | | | First placement information | Finalized flag | Second placement information | Placement restriction flag |
|---|---|---|---|---|---|---|---|---|---|
| | | Type | Attribute | Level | HP | ... | | | |
| a001 | **** | **** | **** | **** | **** | ... | **** | **** | **** | **** |
| a002 | **** | **** | **** | **** | **** | ... | **** | **** | **** | **** |
| ... | ... | ... | ... | ... | ... | ... | ... | ... | ... |

| Second game content ID | Game parameters | | | |
|---|---|---|---|---|
| | Attribute | Level | HP | ... |
| b001 | **** | **** | **** | ... |
| b002 | **** | **** | **** | ... |
| ⋮ | ⋮ | ⋮ | ⋮ | |

NON-TRANSITORY COMPUTER READABLE MEDIUM, METHOD OF CONTROLLING A GAME, AND INFORMATION PROCESSING DEVICE

CROSS-REFERENCE TO RELATED APPLICATIONS

This application is a continuation of U.S. application Ser. No. 16/149,945, filed Oct. 2, 2018, which is a continuation of U.S. application Ser. No. 15/192,058, filed Jun. 24, 2016, which claims priority to and the benefit of Japanese Patent Application No. 2015-183110 filed Sep. 16, 2015, and Japanese Patent Application No. 2015-194166 filed Sep. 30, 2015. The entire contents of all of the foregoing are incorporated herein by reference.

TECHNICAL FIELD

This disclosure relates to a non-transitory computer readable medium, a method of controlling a game, and an information processing device.

BACKGROUND

In a conventional game, a user moves a user character or the like placed on a map and battles enemy characters. For example, JP H11-179048 A (PTL 1) discloses a game in which a user character is moved on a map in accordance with user operation, and upon the user character encountering an enemy character, the user character and the enemy character fight.

CITATION LIST

Patent Literature

PTL 1: JP H11-179048 A

SUMMARY

However, in a game in which information related to the map, such as the shape of the map or the placement of enemies on the map, is determined in advance, there is little change in the map, resulting in a game that is not always highly amusing. On the other hand, for example in a game that automatically creates information related to the map each time, the difficulty and the configuration of the map vary. Therefore, such a game is not always sufficiently amusing. A game in which characters are moved on a map thus has room for improvement in terms of how amusing the game is.

It would therefore be helpful to provide a non-transitory computer readable medium, a method of controlling a game, and an information processing device that make a game more amusing.

One or more non-transitory computer readable media according to this disclosure includes computer program instructions, which when executed by an information processing system, cause the information processing system to:

store, in memory, information related to a plurality of objects, information related to a plurality of first game contents each associated with at least one of the plurality of objects, and intra-object positioning information indicating a position within the one or more of the plurality of objects associated with each of the plurality of first game contents;

associate first positioning information indicating a position in a first virtual space with each of one or more of the plurality of objects in accordance with a first user operation;

associate, based on the first positioning information and the intra-object positioning information, first positioning information in the first virtual space with each of one or more of the plurality of first game contents associated with the one or more of the plurality of objects;

cause the one or more of the plurality of objects and the one or more of the plurality of first game contents to be displayed on a display displaying the first virtual space at the position indicated by the first positioning information associated with each of the one or more objects and the one or more first game contents;

change the first positioning information associated with at least one object among the one or more of the plurality of objects and the first positioning information associated with each first game content associated with the at least one object;

determine whether a predetermined condition is satisfied based on the information related to the one or more objects; and set the first positioning information associated with the one or more of the plurality of objects and the first positioning information associated with the one or more of the plurality of first game contents when the predetermined condition is determined to be satisfied.

A method, according to this disclosure, executed by an information processing device comprises:

storing, in a memory, information related to a plurality of objects, information related to a plurality of first game contents each associated with at least one of the plurality of objects, and intra-object positioning information that indicates a position within the one or more of the plurality of objects associated with each of the plurality of first game contents;

associating first positioning information indicating a position in a first virtual space with each of one or more of the plurality of objects in accordance with a first user operation;

associating, based on the first positioning information and the intra-object positioning information, first positioning information in the first virtual space with each of one or more of the first game contents associated with the one or more objects;

causing the one or more of the plurality of objects and the one or more of the plurality of first game contents to be displayed on a display displaying the first virtual space, at the position indicated by the first positioning information associated with each of the one or more objects and the one or more first game contents;

changing the first positioning information associated with at least one object among the one or more of the plurality of objects and the first positioning information associated with each first game content associated with the at least one object;

determining whether a predetermined condition is satisfied based on the information related to the one or more objects; and set the first positioning information associated with the one or more of the plurality of objects and the first positioning information associated with the one or more of the plurality of first game contents when the predetermined condition is determined to be satisfied.

An information processing system, according to this disclosure, comprises:

a memory configured to store information related to a plurality of objects, information related to a plurality of first game contents each associated with at least one of the plurality of objects, and intra-object positioning information indicating a position within the one or more of the plurality of objects associated with each of the plurality of first game contents; and circuitry configured to associate first positioning information indicating a position in a first virtual space with each of one or more of the plurality of objects in accordance with a first user operation;

associate, based on the first positioning information and the intra-object positioning information, first positioning information in the first virtual space with each of one or more of the plurality of first game contents associated with the one or more of the plurality of objects;

cause the one or more of the plurality of objects and the one or more of the plurality of first game contents to be displayed on a display displaying the first virtual space, at the position indicated by the first positioning information associated with each of the one or more objects and the one or more first game contents;

change the first positioning information associated with at least one object among the one or more of the plurality of objects and the first positioning information associated with each first game content associated with the at least one object;

determine whether a predetermined condition is satisfied based on the information related to the one or more objects; and set the first positioning information associated with the one or more of the plurality of objects and the first positioning information associated with the one or more of the plurality of first game contents when the predetermined condition is determined to be satisfied.

The non-transitory computer readable medium, method of controlling a game, and information processing device of this disclosure make a game more amusing.

BRIEF DESCRIPTION OF THE DRAWINGS

In the accompanying drawings:

FIG. 2 illustrates information, related to users, stored by the server memory in FIG. 1;

FIG. 3 illustrates information related to objects in FIG. 2;

FIG. 4 illustrates information related to first game contents in

FIG. 2;

FIG. 5 illustrates an example of an object;

FIG. 6 illustrates information related to second game contents in

FIG. 2;

DETAILED DESCRIPTION

The following describes embodiments of this disclosure.

Figure 1:
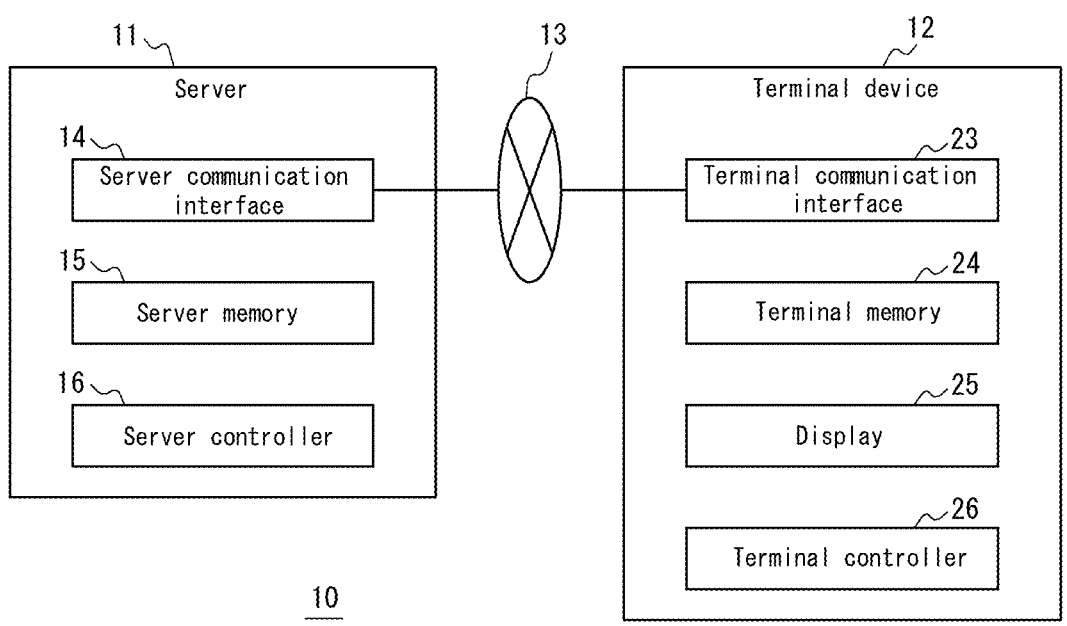
FIG. 1 is a block diagram of a game system according to one of the embodiments.

First, with reference to FIG. 1, a game system 10 according to one of the embodiments is described. The game system 10 includes a server 11 and a plurality of terminal devices 12. While only one terminal device 12 is illustrated in FIG. 1 for the sake of simplicity, the present disclosure encompasses configurations including one or more terminal devices 12. The server 11 provides a game to the terminal devices 12 owned by individual users. The server 11 and the terminal devices 12 are, for example, connected for communication over a network 13 such as the Internet.

An outline of the game according to this embodiment is now provided. The game according to this embodiment is a game that conducts battles using game contents. The game contents are electronic data used in the game and may be any sort of contents, including cards, items, characters, avatars, and the like. The game contents are electronic data that may be acquired, held, used, managed, traded, combined, strengthened, sold, discarded, and/or transferred by users in the game, but the forms of use of the game contents are not limited to the forms specified in this disclosure.

Except when noted otherwise, hereinafter "game contents possessed by the user" refer to game contents associated with a user's user ID. "Granting a game content to a user" refers to associating the game content with a user ID. "Discarding a game content possessed by a user" refers to dissolving the association between a user ID and a game content. "Consuming a game content possessed by a user" refers to how some sort of result or effect may be generated in response to dissolution of the association between a user ID and a game content. "Selling a game content possessed by a user" refers to dissolving the association between a user ID and a game content and associating a different game content (for example, virtual currency, an item, or the like) with the user ID. "Transferring a game content possessed by user A to user B" refers to dissolving the association between the user ID of user A and a game content and associating the game content with the user ID of user B.

In broad terms, the game according to this embodiment includes a first game stage, a second game stage, and a third game stage.

In the first game stage, the user places a virtual object in a first virtual space. One or more game contents (first game content), such as an artillery battery, barracks, a wall, a character, and the like are associated with the object. The placement of the first game contents in a second virtual space is determined in accordance with placement of the object in the first virtual space. In this way, the first game stage generates information necessary for setting the second virtual space in which the first game contents are placed in accordance with the placement of the object in the first virtual space.

In the second game stage, the user's terminal device 12 receives, via the server 11, information that was generated by another user's terminal device 12 that executed the first game stage. This information is necessary for setting the second virtual space. The user then operates a user character (second game content) placed in the second virtual space that was set based on the information received from the server 11 and battles the first game contents placed in the second virtual space. The user also aims to capture the second virtual space (to complete a game task). For example, upon satisfaction of a predetermined condition, such as the second game content moving to a predetermined position or winning a battle against a predetermined first game content (commanding character) in the second virtual space, it is determined that the game task has been successfully completed. In accordance with the results of the second game stage (for example, whether or not the game task has been completed), a predetermined reward (for example, a game content) is granted to the user.

In the third game stage, the user's terminal device 12 repairs the user's own first game contents (for example, increases Hit Points (HP) that decrease for example due to an attack by the other user's second game content) that were harmed (for example, damaged) by a battle with a second game content operated by another user as a result of the second game stage executed on the other user's terminal device 12. For example, as a result of an attack by the second game content, a game parameter (for example, HP) of the first game content reduces. The user's terminal device 12 for example consumes a predetermined game content, such as virtual currency, an item, or the like, associated with the user and increases the reduced HP of the first game content to approach a target value (for example, the maximum). The amount of change in the game parameter of the first game content may differ in accordance with the type and number (amount) of the consumed game content. For example, the amount of change in the game parameter may increase as the number (amount) of the consumed game content is larger, or as the rarity of the consumed game content is higher.

In the game according to this embodiment, for example in accordance with the placement of objects (and first game contents) in the first virtual space, the placement of first game contents in the second virtual space changes, thereby changing the strategic difficulty of the second virtual space. Accordingly, in the first game stage, the user for example becomes creative with the combination and placement of objects in the first virtual space to increase the strategic difficulty of the user's own second virtual space, so as to prevent another user from capturing the second virtual space. In the second game stage, the user attempts to capture another second virtual space pertaining to another user. In the third game stage, the user repairs the first game contents that were harmed as a result of the second game stage executed by the other user, thereby preparing for the next second game stage executed by another user.

Next, the structural components of the game system 10 are described. The server 11 includes a server communication interface 14, a server memory 15, and a server controller 16.

The server communication interface 14 is an interface that communicates with an external device via a wired or wireless connection to transmit and receive information. The server communication interface 14 transmits and receives information to and from the terminal devices 12 via the network 13.

The server memory 15 is, for example, a storage device storing a variety of information and programs necessary for providing and controlling the game.

For example, the server memory 15 stores information indicating the correspondence relationship (correspondence information) between positioning information indicating a position in the first virtual space (first positioning information) and positioning information indicating a position in the second virtual space (second positioning information). The first virtual space is described below as being a 3D virtual space having an xyz coordinate system, but the first virtual space may be a 2D virtual space instead. The first positioning information is indicated by a combination of xyz coordinates (x, y, z). The second virtual space is also described below as being a 3D virtual space having an XYZ coordinate system, but the second virtual space may be a 2D virtual space instead. The second positioning information is indicated by a combination of XYZ coordinates (X, Y, Z). In this embodiment, one piece of second positioning information (X, Y, Z) has a unique correspondence relationship with one piece of first positioning information (x, y, z).

The server memory 15 stores information related to the user for each user. Specifically, the information related to the user includes information related to objects, information related to first game contents, and information related to second game contents, all in association with a user ID, for example as illustrated in FIG. 2. The user ID is information that can uniquely identify a user.

With reference to FIG. 3, the information related to objects is first described. The information related to objects includes shape data, connecting positionpositioning information, a cost, first placing information, a condition completed flag, and a finalized flag, all associated with an object ID. The object ID is information that can uniquely identify an object.

The shape data is information indicating the shape of an object.

The connecting positionpositioning information is information that is set for the object and indicates a predetermined position (connecting position) within the object. As described below, in the first game stage, one or more objects are placed so as to have a predetermined relative positional relationship with one or more other objects. In this embodiment, the predetermined relative positional relationship is such that the connecting position of an object and the connecting position of another object are at approximately the same position in the first virtual space.

As described below, the cost is a parameter that can be used to determine whether a first condition is satisfied and/or whether a second condition is satisfied. As described below, the value of the cost may be determined in accordance with information related to the first game contents (such as the type, level, and the like of the first game contents) associated with the object (object ID) or may be determined in advance.

The first placing information is information indicating placement of objects in the first virtual space. In this embodiment, the first placing information includes the first positioning information on objects placed in the first virtual space and direction information indicating the direction faced by objects placed in the first virtual space, but the first placing information may include any information related to placement of objects in the first virtual space.

Hereinafter, "placing" an object, for example, is described as including the association of placing information (including positioning information) with the object.

In this embodiment, objects are placed in the xy plane at z=0 in the first virtual space. Accordingly, the first positioning information associated with an object placed in the first virtual space is indicated by a combination of coordinates (x, y, 0) in the xyz coordinate system.

The condition completed flag is a flag indicating whether the object satisfies a second condition, which is described below. In this embodiment, when it is determined that a second condition is satisfied in response to a user operation that ends movement of an object, as described below, the condition completed flag associated with the object is set (i.e. changed from off to on). An object with which is associated a condition completed flag that has been set is an object that satisfies the second condition.

The finalized flag is a flag indicating whether the first placing information associated with an object has been finalized. In this embodiment, when it is determined that a first condition is satisfied in response to a user operation that ends the first game stage, as described below, the finalized flag associated with the object is set (i.e. changed from off to on). An object with which is associated a finalized flag that has been set is an object for which the first placing information associated with the object has been finalized. Hereinafter, finalizing the first placing information (including the first positioning information) associated with an object is referred to as finalizing the placement of the object.

Next, with reference to FIG. 4, the information related to first game contents is described. In this embodiment, the information related to first game contents is associated with a user ID, as described above, and is also associated with the object ID included in the information related to objects. In other words, information on first game contents is associated with each object ID included in the information related to objects. For example, FIG. 4 illustrates information related to first game contents associated with object ID "object001" (see FIG. 3).

As illustrated in FIG. 4, the information related to first game contents includes intra-object placing information, game parameters, the first placing information, the finalized flag, second placing information, and a placement restricted flag, all associated with a first game content ID. The first game content ID is information uniquely identifying a first game content.

The intra-object placing information is information indicating placement of first game contents within an object. In this embodiment, the intra-object placing information includes intra-object positioning information indicating the position within the object of first game contents placed within the object and direction information indicating the direction faced by first game contents placed within the object, but the intra-object placing information may include any information related to placement of first game contents within an object. The intra-object positioning information is indicated by a combination of an x coordinate and a y coordinate (dx, dy) in an xyz coordinate system based on a predetermined origin set within the object. In this way, placement of each first game content is fixed with respect to the object. In this embodiment, the intra-object placing information is determined in advance for each first game content, but for example a configuration may be adopted to allow the user to change the intra-object placing information using the terminal device 12.

The game parameters include a variety of parameters that are related to the game content and are necessary for game progress. The game parameters included in the information related to the first game contents are, for example, used in the second game stage executed by the terminal device 12 of another user who is attempting to capture the user's second virtual space. In this embodiment, the game parameters included in the information related to the first game contents include type, attribute, level, and HP.

The type indicates the type of the first game content. For example, in the second game stage executed by another user's terminal device 12, each first game content has a different role, function, effect, and the like in accordance with the type. In this embodiment, the types of first game contents include an artillery battery, barracks, lieutenant character, commanding character, wall, and the like, but the types are not limited to these examples.

The artillery battery automatically attacks (by cannon fire) the other user's second game content that is placed in the second virtual space. The HP of the second game content are reduced by the amount of damage inflicted by the cannon fire. For example, when the HP of the other user's second game content reach zero, it is determined on the other user's terminal device 12 that the other user has failed to complete the game task.

For example, during the second game stage by the other user's terminal device 12, the barracks generate a soldier character (third game content), such as in accordance with passage of time. Second positioning information is associated with the generated third game content. The third game content is placed at a position within the second virtual space indicated by the associated second positioning information and for example operates automatically to battle the other user's second game content. For example, the HP of the second game content are reduced by the amount of damage inflicted by the attack of the third game content.

Like the above-described third game content, the lieutenant character (designated first game content) battles the other user's second game content. As described below, information related to first game contents associated with another object that has a predetermined relative positional relationship in the first virtual space with respect to an object (designated object) with which the lieutenant character is associated may change. For example, among first game contents associated with another object placed adjacent to the designated object, for example a game parameter of a first game content with which is associated the same attribute as the attribute of the lieutenant character changes (for example, the HP increase).

Like the above-described third game content, lieutenant character, and the like, the commanding character battles the other user's second game content. As described below, upon the commanding character losing a battle with the other user's second game content, it may be determined on the other user's terminal device 12 that the other user has succeeded in completing the game task.

The wall is an obstacle that blocks movement of the other user's second game content. As described below, in this embodiment, a plurality of walls are placed within the object along the entire perimeter of the object's shape. The plurality of walls include walls placed at one or more connecting positions set in the object. In other words, among the plurality of walls placed along the entire perimeter of the object's shape, the intra-object positioning information associated with at least one wall is set as a connecting position.

The attribute is information indicating a hierarchical relationship among game contents. In this embodiment, the attribute for example indicates at least one attribute from among the attributes of fire, wood, and water. For example, a game content with the fire attribute inflicts greater damage than usual on a game content with the wood attribute and less damage than usual on a game content with the water attribute. The types of attributes are not limited to fire, wood, and water, and any types of attributes may exist.

The level is a parameter indicating the degree of growth of a first game content. For example, when the level increases, other game parameters change (for example, HP increase).

Hit Points (HP) are a parameter that decrease for example due to an attack by the other user's second game content. For example when the HP reach zero, the first game content is determined to have lost. The role, function, effect, and the like, such as cannon fire, movement, or attacking, of the first game content that has lost are suspended.

The game parameters are not limited to the above examples and may, for example, include attack strength, defense strength, rate at which the barracks generate the third game content, and game parameters for association with the generated third game content (for example, attribute, HP, and the like of the third game content).

The first placing information is information indicating placement of the first game contents in the first virtual space. In this embodiment, the first placing information includes the first positioning information on first game contents placed in the first virtual space and direction information indicating the direction faced by first game contents placed in the first virtual space, but the first placing information may include any information related to placement of first game contents in the first virtual space.

The first placing information associated with the first game content is determined based on the first placing information associated with an object, as described above, and on intra-object placing information associated with the first game content.

Specifically, as described below, when first information is associated with an object by execution of the first game stage, then the first positioning information of first game contents in the first virtual space is determined based on the first positioning information of the object and on the intra-object positioning information associated with the first game contents. For example, when first positioning information (x, y, 0) is associated with an object during the first game stage, i.e. when the first positioning information in the first virtual space having an origin set within the object is (x, y, 0), then first positioning information (x+dx, y+dy, f(x+dx, y+dy)) is associated with each first game content corresponding to the object. Here, f(x, y) is a value determined for each possible combination of x coordinate and y coordinate in the first virtual space. For example, f(x, y) indicates the height from virtual ground in the first virtual space.

The finalized flag is a flag indicating whether the first placing information associated with a first game content has been finalized. In this embodiment, when it is determined that a first condition is satisfied in response to a user operation that ends the first game stage, as described below, the finalized flag associated with the first game content is set. A first game content with which is associated a finalized flag that has been set is a first game content for which the first placing information associated with the first game content has been finalized. Hereinafter, finalizing the first placing information (including the first positioning information) associated with a first game content is referred to as finalizing the placement of the first game content.

The second placing information is information indicating placement of the first game contents in the second virtual space. In this embodiment, the second placing information includes the second positioning information on first game contents placed in the second virtual space and direction information indicating the direction faced by first game contents placed in the second virtual space, but the second placing information may include any information related to placement of first game contents in the second virtual space.

The second positioning information is determined based on the first positioning information of the first game content and on correspondence information indicating the correspondence relationship between the first positioning information and the second positioning information. Specifically, as described below, when the first positioning information of a first game content is finalized by execution of the first game stage, then using the correspondence information, the second positioning information (X, Y, Z) corresponding to the first positioning information (x+dx, y+dy, f(x+dx, y+dy)) of the first game content is determined.

The placement restricted flag is a flag indicating whether to restrict (suspend) placement of the first game content in the second virtual space. In this embodiment, when the connecting position of an object and the connecting position of another object have a predetermined relative positional relationship in the first virtual space (for example, when two connecting positions exist at approximately the same position in the first virtual space), then the placement restricted flag associated with a wall, which is a first game content, placed at the connecting position in the object is set (changed from off to on). A first game content with which is associated a placement restricted flag that has been set is not placed in the second virtual space during the second game stage executed by the other user's terminal device 12.

Figures 5, 6:
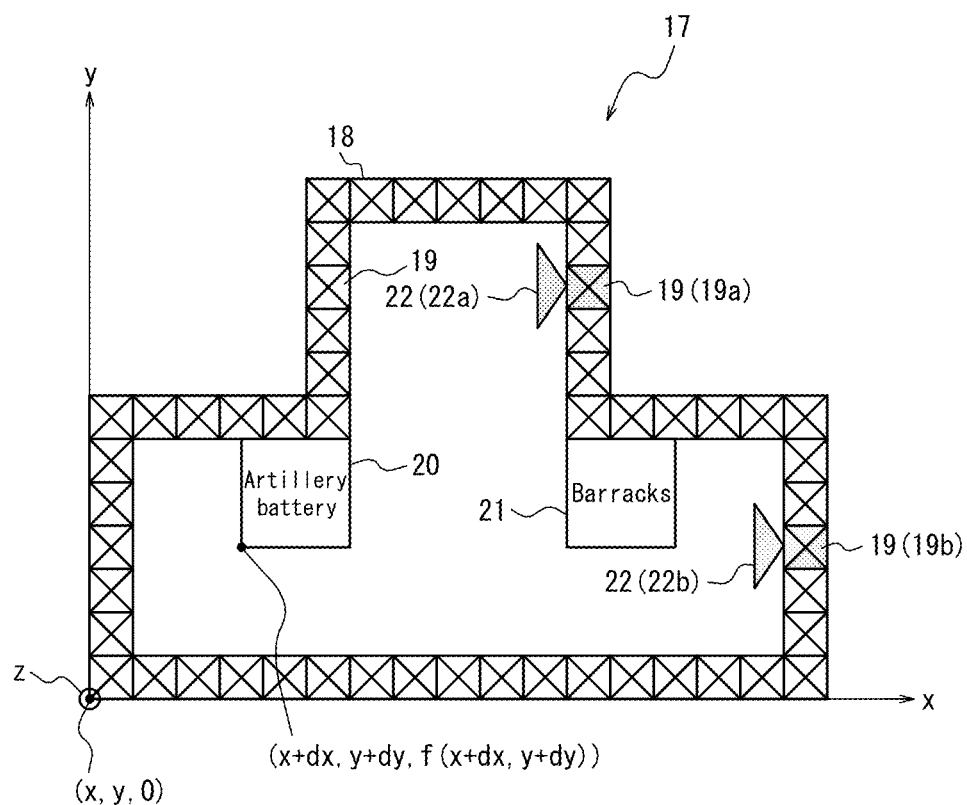

With reference to FIG. 5, an example of an object 17 is described. The object 17 illustrated in FIG. 5 for example has a T shape when viewed along the z axis in the negative direction of the z axis. In this embodiment, a plurality of walls 19 are placed within the object 17 along the entire perimeter 18 of the T-shaped object 17. An artillery battery 20 and barracks 21 are also placed inside the object 17.

In FIG. 5, two connecting positions set in the object 17 are indicated by triangular markers 22 (22a, 22b). The walls 19a and 19b are walls 19 respectively disposed at the connecting positions indicated by the markers 22a and 22b.

As described above, once the object 17 is placed in the first virtual space, for example first positioning information (x, y, 0) is associated with the object 17. In this case, first positioning information (x+dx, y+dy, f(x+dx, y+dy)) is associated with a first game content (for example, the artillery battery 20) that is associated with the object 17, as described above.

Next, with reference to FIG. 6, the information related to second game contents is described. The information related to second game contents includes game parameters associated with a second game content ID. The second game content ID is information uniquely identifying a second game content.

As described above, the game parameters include a variety of parameters that are related to the game content and are necessary for game progress. The game parameters included in the information related to the second game contents are used for example in the second game stage executed by the user's terminal device 12. In this embodiment, the game parameters included in the information related to the second game contents include attribute, level, and HP.

The attribute corresponds to the attributes included in the above-described information related to first game contents and for example indicates at least one attribute from among the attributes of fire, wood, and water.

The level is a parameter indicating the degree of growth of a second game content. For example, as the level increases, a predetermined game parameter such as HP changes (for example increases).

Hit Points (HP) are a parameter that decrease for example due to an attack by first game contents and third game contents placed in another second virtual space. In this embodiment, when the HP of the second game content reach zero, it is determined that the user has failed to complete the game task in the second game stage.

The game parameters are not limited to the examples described above and may, for example, include attack strength and defense strength, and also commands, skills, special moves, and the like that can be executed by the second game content.

The second game content is, for example, a character that the user possesses in the game, but this example is not limiting. For example, a deck combining a plurality of game contents, such as characters or cards, may be used as the second game contents. The information related to the second game contents may, for example, include information on other game contents that change game parameters of the second game contents. The other game contents for example include game contents associated with second game contents, such as equipment with which the second game contents are equipped.

While the case of storing information related to the user in the server memory 15 has been described, this information related to the user may be shared by being stored in both the server 11 and the user's terminal device 12. For example, when information related to the user is updated on one of the server 11 and the terminal device 12, information relating to the update is transmitted to the other one so that the server 11 and the terminal device 12 both store identical information.

The information related to the user may include any information necessary for game play by the user, such as information related to game contents possessed by the user in the game, the user's level, and the like.

The server controller 16 illustrated in FIG. 1 is, for example, a dedicated microprocessor or a CPU that implements specific functions by reading a specific program. The server controller 16 controls the overall operations of the server 11. For example, the server controller 16 transmits and receives information via the server communication interface 14.

The server controller 16 also stores information related to the user in the server memory 15.

As described above, the server controller 16 stores the same information related to the user as is stored on the user's terminal device 12.

Specifically, the server controller 16 transmits information related to the user to the user's terminal device 12 to cause the terminal device 12 to store the information. Upon updating the information, related to the user, that is stored in the server memory 15, the server controller 16 transmits information related to the update, among the information related to the user, to the user's terminal device 12. For example, as described below, upon receiving information on the result of the second game stage from the terminal device 12 (for example, information indicating whether the user succeeded in completing the game task), the server controller 16 associates a predetermined reward (for example, a game content) with the user's user ID in accordance with whether the game task was successfully completed and updates information on the user stored in the server memory 15. The server controller 16 transmits information indicating the reward associated with the user ID to the terminal device 12.

Specifically, upon receiving, from the user's terminal device 12, information related to an update among information related to the user, the server controller 16 uses the information to update the information, related to the user, that is stored in the server memory 15. For example as described below, upon receiving, from the user's terminal device 12, information related to a first game content with which second placing information is associated (see FIG. 4), the server controller 16 uses this information to update the information, related to the user, that is stored in the server memory 15.

Upon receiving a request to start the first game stage from the terminal device 12, the server controller 16 transmits an instruction to start the first game stage to the terminal device 12. This instruction includes information necessary for executing the first game stage, such as information related to the user of the terminal device 12.

Upon receiving a request to start the second game stage from a certain user's terminal device 12, the server controller 16 selects, from among a plurality of users, a user other than the requesting user. The other user that is selected may, for example, be a user designated by the request to start the second game stage. Next, the server controller 16 transmits an instruction to start the second game stage to the terminal device 12. This instruction includes information necessary for executing the second game stage, such as information, among the information related to the other user, related to a first game content with which second placing information is associated.

The server controller 16 changes the game parameters of the first game content in accordance with passage of time at a predetermined time rate of change.

For example, as a result of the second game stage executed on user B's terminal device 12, if a game parameter of a first game content associated with user A's user ID changes, then the server controller 16 changes the game parameter in accordance with passage of time at a predetermined time rate of change so as to cancel out the change in the game parameter. Specifically, if the HP of a first game content decreases as a result of the second game stage, then the server controller 16 increases the HP in accordance with passage of time at a predetermined time rate of change, up to the maximum.

In another example, as a result of the second game stage executed on user B's terminal device 12, if a game parameter of a first game content associated with user A's user ID enters a predetermined state, then the server controller 16 changes a game parameter of the first game content in accordance with passage of time at a predetermined time rate of change. Specifically, if a first game content (such as the barracks) enters a predetermined state (such as being on fire) as a result of the second game stage, then the HP of the first game content decrease in accordance with passage of time at a predetermined time rate of change.

The time rate of change of the game parameters may, for example, be determined based on any game parameter, such as the type or level of the first game content. For example, as the level of the first game content is higher, the time rate of change of the game parameter increases or decreases. In this way, the server controller 16 changes the game parameters of the first game contents at a predetermined time rate of change, for example regardless of whether user A is playing the game using the terminal device 12. According to this configuration, a game that progresses in real time is implemented, even when the user for example intermittently plays the game, i.e. when there are periods in which the user is not playing the game.

Upon receiving a request to start the third game stage from the terminal device 12, the server controller 16 transmits an instruction to start the third game stage to the terminal device 12. This instruction includes information necessary for executing the third game stage, such as information, among the information related to the user of the terminal device 12, related to first game contents with which second placing information is associated.

Next, the terminal device 12 illustrated in FIG. 1 is described. The terminal device 12 includes a terminal communication interface 23, a terminal memory 24, a display 25, and a terminal controller 26.

The terminal communication interface 23 is an interface that communicates with an external device via a wired or wireless connection to transmit and receive information. The terminal communication interface 23 transmits and receives information to and from the server 11 via the network 13.

The terminal memory 24 is, for example, a storage device storing a variety of information and programs necessary for processing of the game provided by the server 11. For example, the terminal memory 24 stores, in advance, an application for the game according to this embodiment.

Like the above-described server memory 15, the terminal memory 24 stores correspondence information indicating the correspondence relationship between the first positioning information in the first virtual space and the second positioning information in the second virtual space.

The display 25 is a display device, such as a liquid crystal display or an organic EL display, and displays a variety of game screens related to the game provided by the server 11. The display 25 may, for example, be configured with a touch panel to function as an interface that detects user operation.

The terminal controller 26 is a dedicated microprocessor or a CPU that implements specific functions by reading a specific program. The terminal controller 26 controls the overall operations of the terminal device 12. For example, the terminal controller 26 transmits and receives information via the terminal communication interface 23. The terminal controller 26 also executes a game application in response to a user operation on the display 25.

As described above, the terminal controller 26 and the server 11 store the same information related to the user of the terminal device 12.

Specifically, upon receiving information related to the user from the server 11, the terminal controller 26 stores the received information in the terminal memory 24. Upon updating the information, related to the user, that is stored in the terminal memory 24, the terminal controller 26 transmits information related to the update, among the information related to the user, to the server 11. For example, the terminal controller 26 associates the second positioning information with the first game content in the first game stage, as described below, and updates the information, related to the user, stored in the terminal memory 24. The terminal controller 26 also transmits information related to the first game content with which the second positioning information was associated to the server 11.

Furthermore, upon receiving information related to an update, among the information related to the user, from the server 11, the terminal controller 26 uses this information to update the information, related to the user, that is stored in the terminal memory 24. For example, upon receiving information indicating a reward associated with the user, the terminal controller 26 uses this information to update the information, related to the user, that is stored in the terminal memory 24.

The terminal controller 26 also executes processing for the first game stage, processing for the second game stage, and processing for the third game stage. Details are provided below.

Processing for the First Game Stage

First, the processing for the first game stage is described. In accordance with user operation to start the first game stage, the terminal controller 26 first transmits a request to start the first game stage to the server 11.

Next, the terminal controller 26 receives an instruction to start the first game stage from the server 11, which received the request to start the first game stage.

Next, the terminal controller 26 displays a first game stage screen on the display 25 and starts the first game stage.

Figure 7:
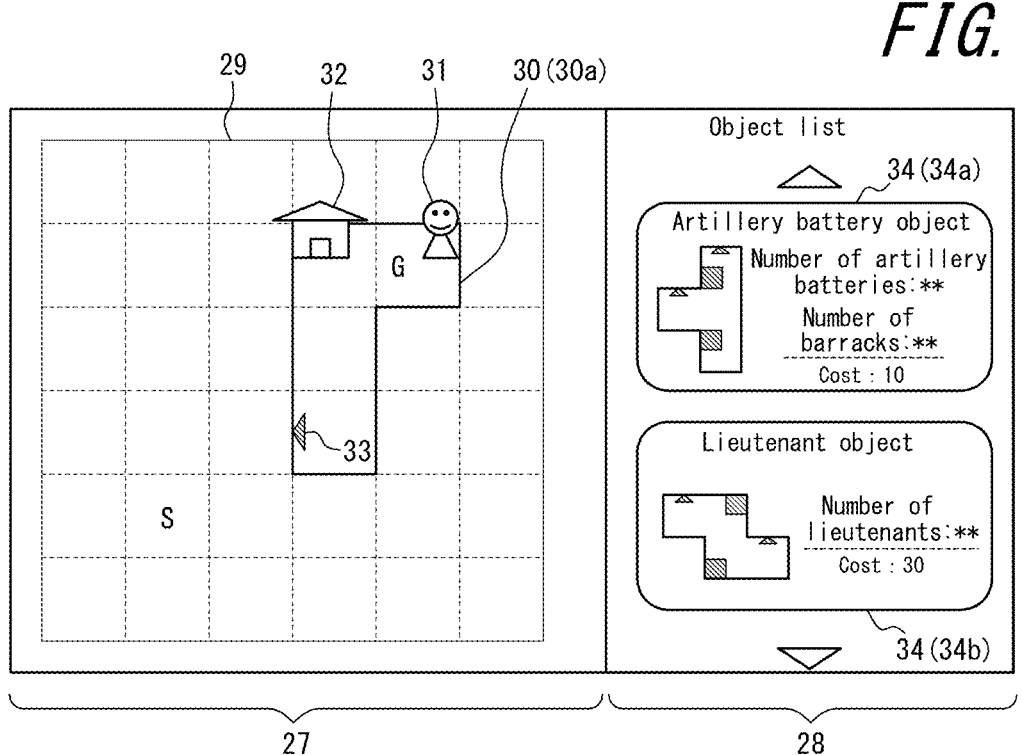
FIG. 7 illustrates an example of a first game stage screen.

With reference to the first game stage screens illustrated in FIGS. 7 to 10, the following describes operations by the terminal controller 26 that conducts the first game stage. FIG. 7 illustrates a first game stage screen that, for example, is displayed immediately after the start of the first game stage. The first game stage screen includes a display area 27 for the first virtual space and an object list 28.

The display area 27 for the first virtual space is an area in which a first virtual space 29 is displayed. FIG. 7 illustrates the first virtual space 29 when viewing the first virtual space 29 along the z axis in the negative direction of the z axis, but the displaying state of the first virtual space 29 is not limited to this case. For example, the terminal controller 26 may change the displaying state of the first virtual space 29 (such as the perspective or scale) in accordance with a predetermined user operation on the display area 27 for the first virtual space (such as a swipe or a pinch).

In this embodiment, when viewing the first virtual space 29 along the z axis in the negative direction of the z axis, the first virtual space 29 is for example partitioned into a plurality of square areas (divided by dashed lines in the drawings) in the xy plane. The objects for example have a shape that is in units of the square areas and is formed by combining one or more squares. As described below, when an object placed in the first virtual space 29 is moved in response to a predetermined user operation, the object moves along the x axis or the y axis in units of the square areas. Accordingly, the user for example places objects in the first virtual space 29 as though assembling puzzle pieces.

A start position S and a goal position G are established in advance in the first virtual space 29. The terminal controller 26 places an object 30 (30a) in advance so as to include the goal position G within the object 30a.

The object 30a placed in advance in this embodiment is an object 30 with which at least the commanding character 31 is associated. The commanding character 31 is a first game content. In FIG. 7, a plurality of first game contents are associated with the object 30a, namely the commanding character 31, barracks 32, and walls. To simplify the illustration, the walls are omitted from the drawings.

In FIG. 7, the commanding character 31 and the barracks 32 are displayed for example in a first displaying state that uses an image indicating a unique external appearance for each first game content (or each type of first game content). A marker 33 that indicates the connecting position set for the object 30a is also displayed.

The object list 28 is an area in which object buttons 34 (34a, 34b) respectively corresponding to a plurality of objects are displayed.

Each object button 34 is an interface for accepting a user operation (first user operation) to place the corresponding object 30 in the first virtual space. As described below, upon detecting the first user operation on an object button 34, the terminal controller 26 places the object 30 corresponding to the object button 34 in the first virtual space 29.

An image of the corresponding object 30, the object name, information related to the first game contents associated with the object 30, such as the number of each type of first game contents, and the cost of the object are displayed in the object button 34.

The object name is, for example, automatically determined by the terminal controller 26 in accordance with information related to the first game contents associated with the object 30. In this embodiment, the object name is determined in accordance with the type of the first game content having the greatest number among the first game contents associated with the object 30. Any method for determining the object name may, however, be adopted, such as selecting a name that indicates the type of first game content that has the highest level. In this way, in a configuration in which a plurality of first game contents can be operated together by object, the user can recognize the object's characteristics, thereby reducing the complexity of handling objects.

The displaying state of the above-described object list 28 is not limited to the above-described displaying state. For example, the object list 28 may be an area, on the first game stage screen, that displays only those objects, among objects associated with a user, that have not been placed in the first virtual space 29. Alternatively, the object list 28 may be displayed on a different screen (object storage screen) than the first game stage screen. Images of objects may also, for example, be displayed in the object list 28, and the images of objects may be caused to function as the object buttons 34.

Next, the terminal controller 26 starts to wait for a user operation on the first game stage screen.

Figure 8:
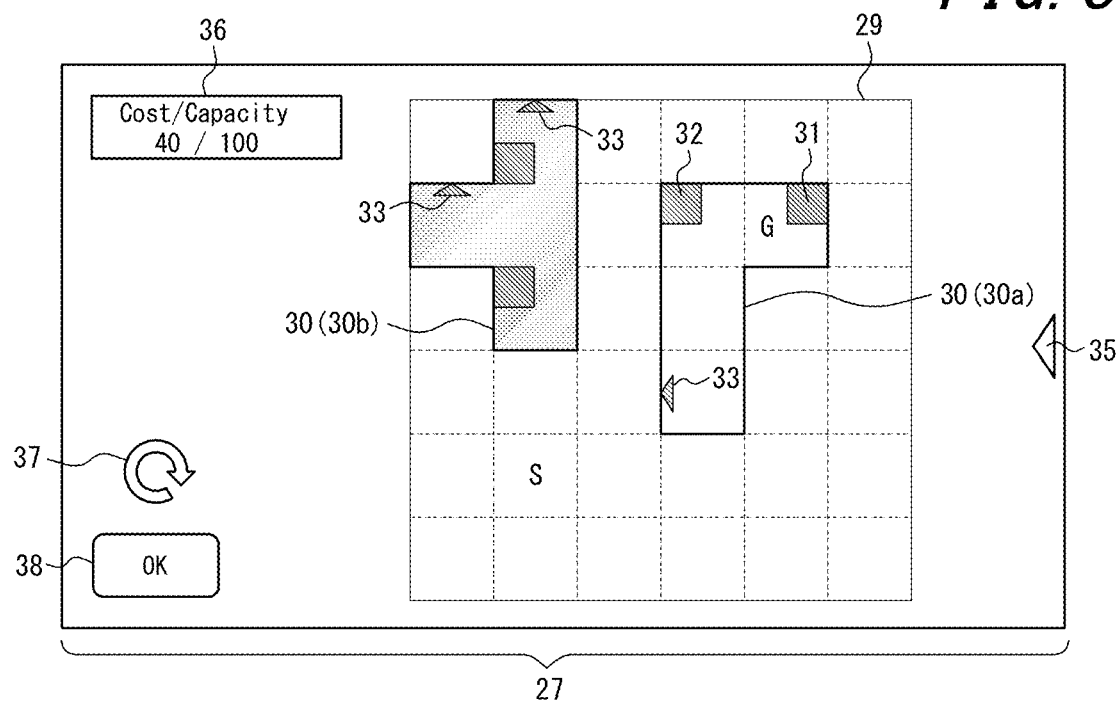
FIG. 8 illustrates an example of the first game stage screen.

Upon detecting the first user operation on the object button 34a, the terminal controller 26 establishes the entire area on the first game stage screen as being the display area 27 for the first virtual space and hides the object list 28, for example as illustrated in FIG. 8.

The terminal controller 26 also places an object 30 (30b) corresponding to the object button 34a in the first virtual space 29. Specifically, the terminal controller 26 associates first placing information including first positioning information (x, y, 0) in the first virtual space 29 with the object 30b. Next, based on the first positioning information (x, y, 0) of the object 30b and the intra-object positioning information (dx, dy), the terminal controller 26 automatically associates first placing information that includes first positioning information (x+dx, y+dy, f(x+dx, y+dy)) with each first game content corresponding to the object 30b. The terminal controller 26 then displays the object 30b and the first game contents at positions in the first virtual space 29 indicated by the pieces of first positioning information associated with the object 30b and the first game contents. The object 30b is displayed so as to be movable in response to a predetermined user operation, as described below.

Hereinafter, an object 30 displayed so as to be movable is also referred to as an object 30 in a movable state. For example, upon detecting a user operation (for example, tap) on another object 30a displayed in the display area 27 for the first virtual space, the terminal controller 26 may remove the object 30b from the movable state and place the object 30a in the movable state. In other words, the terminal controller 26 switches the object 30 that is in the movable state in response to a user operation on the object 30 displayed in the display area 27 for the first virtual space.

Next, the terminal controller 26 changes the displaying state of the first game contents associated with the objects 30 (30a, 30b) placed in the first virtual space 29 from the first displaying state to a second displaying state. For example, as illustrated in FIG. 8, in the second displaying state, the commanding character 31 and barracks 32 associated with the object 30a are displayed as an image with a simpler shape than in the first displaying state, for example an image of a geometrical shape such as a polygon or a polyhedron. In the second displaying state, the images indicating the first game contents may be color-coded in accordance with game parameters of the first game contents, such as the type, attribute, or level.

Next, the terminal controller 26 displays a list button 35, a cost display area 36, rotate button 37, and an OK button 38 on the first game stage screen.

The list button 35 is a user interface for accepting a user operation to display the object list 28 that was hidden. Upon detecting a user operation on the list button 35, the terminal controller 26 displays the object list 28 on the first game stage screen, for example as in FIG. 5.

The cost display area 36 is an area in which the total cost of all of the objects 30 placed in the first virtual space 29 and a predetermined threshold (capacity) are displayed.

The rotate button 37 is a user interface for accepting a user operation to change the direction of the object 30 displayed so as to be movable. Upon detecting a user operation on the rotate button 37, the terminal controller 26 changes the direction faced by the object 30 displayed so as to be movable (in FIG. 8, the object 30b) for example by a 90° clockwise rotation within the xy plane in the first virtual space 29.

The OK button 38 is a user interface for accepting a user operation to end the first game stage. Upon detecting a user operation on the OK button 38, the terminal controller 26 determines whether a predetermined condition (first condition) is satisfied based on information related to all of the objects 30 placed in the first virtual space 29.

For example, the first condition may include, but is not limited to, at least one of the following: (1a) a condition such that at least one connecting position set in each object 30 placed in the first virtual space 29 has a predetermined relative positional relationship with respect to at least one connecting position set in another object 30; (2a) a condition such that the total cost of all of the placed objects 30 is equal to or less than the capacity; (3a) a condition such that the placed objects 30 do not overlap; (4a) a condition such that the start position S and the goal position G are included in one or more placed objects 30; and (5a) a condition such that the below-described second condition is satisfied. The first condition may include any other condition other than the above-described conditions. For example, a predetermined area in which placement is prohibited may be set in the first virtual space 29, and a condition such that the placed objects 30 do not overlap with the area in which placement is prohibited may be included. Operations by the terminal controller 26 in accordance with the determination of whether or not the first condition is satisfied are described below.

Next, upon detecting a user operation (movement operation) to move the object 30b, which is displayed so as to be movable, in the first virtual space 29, the terminal controller 26 moves the object 30b in the first virtual space in accordance with the movement operation. In other words, the terminal controller 26 changes the first positioning information included in the first placing information associated with the object 30b and the first game contents corresponding to the object 30b. The movement operation may, for example, be an operation in which the user swipes the screen while contacting the object 30b on the screen with a finger.

Next, upon detecting a user operation to end movement of the object 30b displayed so as to be movable (operation to end movement), the terminal controller 26 determines whether a predetermined condition (second condition) is satisfied based on information related to the objects 30 placed in the first virtual space 29. The operation to end movement may, for example, be an operation in which the user releases the finger from the object 30b on the screen.

For example, the second condition may include, but is not limited to, at least one of the following: (1b) a condition such that at least one connecting position set in the object 30b displayed so as to be movable has a predetermined relative positional relationship with respect to at least one connecting position set in another object 30a; (2b) a condition such that the total cost of all of the placed objects 30 (30a, 30b) is equal to or less than the capacity; and (3b) a condition such that the object 30b displayed so as to be movable does not overlap the other object 30a. The second condition may include any other condition other than the above-described conditions. For example, a predetermined area in which placement is prohibited may be set in the first virtual space 29, and a condition such that the object 30b displayed so as to be movable does not overlap with the area in which placement is prohibited may be included.

When determining that the second condition is not satisfied, the terminal controller 26 displays the object 30b, which is displayed so as to be movable, in a different state than usual. For example, in FIG. 8, as indicated by the markers 33, the connecting positions set in the object 30b and the connecting position set in the object 30a are at different positions in the first virtual space. Therefore, among the second conditions, it is determined that the above-described condition (1b) is not satisfied. In this case, the terminal controller 26 displays the object 30b in a state that emphasizes the object 30b, for example by changing the color of the object 30b (see FIG. 8) or by causing the object 30b to blink. In this way, the user is notified that the second condition has not been satisfied and is encouraged to move the object 30b again so as to satisfy the second condition.

On the other hand, when determining that the second condition has been satisfied, the terminal controller 26 sets the condition completed flag corresponding to the object 30b displayed so as to be movable. For example, FIG. 9 shows the objects 30a and 30b satisfying the second condition.

Next, upon detecting a user operation on the OK button 38, the terminal controller 26 determines whether the above-described first condition is satisfied based on information related to all of the objects 30 (30a, 30b) placed in the first virtual space 29.

For example, when determining that the first condition is not satisfied, the terminal controller 26 changes the on-screen displaying state of at least one object with which information that does not satisfy the first condition is associated, so that the user can identify the at least one object. Specifically, among first conditions, when for example the condition that the placed objects 30 do not overlap is determined not to be satisfied, the terminal controller 26 emphasizes, in a predetermined manner, the display of at least one object 30 placed in overlap, such as by changing the color of the object or causing the object to blink. The terminal controller 26 preferably displays information on the screen indicating the condition that is not satisfied. For example, an image may be displayed to notify the user that the placed objects 30 are in overlap.

Figure 9:
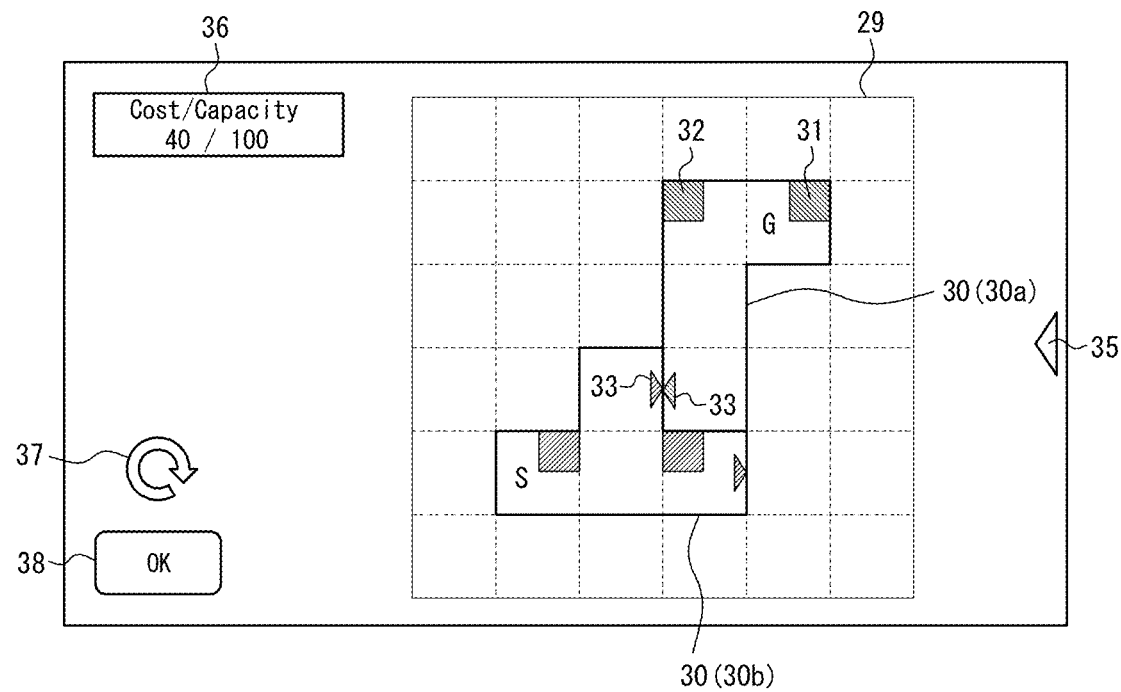
FIG. 9 illustrates an example of the first game stage screen.

In FIG. 9, (1) as indicated by the two markers 33, the connecting position of the object 30a and the connecting position of the object 30b exist at approximately the same position in the first virtual space 29. Furthermore, (2) the total cost of the objects 30a and 30b (for example, 40 points) is equal to or less than the capacity (for example, 100 points). (3) The objects 30a and 30b have been placed without overlapping. (4) The start position S and the goal position G are included in the objects 30a and 30b. Finally, (5) all of the placed objects 30a and 30b satisfy the second condition. Accordingly, since the above-described conditions (1a) through (5a) included in the first condition are satisfied, it is determined that the first condition is satisfied.

When determining that the first condition is satisfied, the terminal controller 26 finalizes the first placing information associated with all of the objects 30 (30a, 30b) placed in the first virtual space 29 and the first placing information associated with the first game contents corresponding to all of the objects 30 (30a, 30b). Specifically, the terminal controller 26 sets the finalized flags associated with all of the objects 30 (30a, 30b). The terminal controller 26 also sets the finalized flags associated with the first game contents corresponding to all of the objects 30 (30a, 30b).

Next, in accordance with the relative positional relationship in the first virtual space 29 of two or more objects 30, the terminal controller 26 changes the information related to first game contents associated with at least one object 30 among the two or more objects 30. Specifically, the placement restricted flag or the game parameters included in the information related to the first game contents change. Details are provided below.

First, operations by the terminal controller 26 to change the placement restricted flag included in the information related to the first game contents are described. For example, as indicated by the markers 33 in FIG. 9, the connecting positions set in the objects 30a and 30b are in a relative positional relationship such that the connecting positions exist at approximately the same position in the first virtual space 29. Upon detecting this relative positional relationship of the objects 30a and 30b, the terminal controller 26 sets the placement restricted flags corresponding to the first game contents (walls) placed at the connecting positions of the objects 30a and 30b. In this way, placement in the second virtual space of the walls placed at the connecting positions of the objects 30 is restricted.

Next, operations by the terminal controller 26 to change the game parameters included in the information related to the first game contents are described. The lieutenant character is a first game content (designated first game content), and with respect to the object 30 (designated object) with which the lieutenant character is associated, the terminal controller 26 identifies another object 30 having a relative positional relationship, for example being adjacent to the designated object. The terminal controller 26 then changes the game parameters of the first game contents associated with the other object 30 that was identified. For example, among the first game contents associated with the other object 30, the terminal controller 26 increases a first game parameter (for example, attack strength) of a first game content with which is associated the same attribute as the attribute of the designated first game content. The terminal controller 26 preferably determines the amount of change in the first game parameter of the first game content in accordance with a second game parameter (for example, HP) of the designated first game content. For example, as the HP of the designated first game content are greater, the amount of increase in the attack strength of the first game content is larger.

Next, the terminal controller 26 associates second positioning information in the second virtual space with the first game contents associated with all of the objects 30 (30*a*, 30*b*) that were placed in the first virtual space 29. The terminal controller 26 may omit the association of the second positioning information for first game contents with which the placement restricted flag that was set is associated.

Figure 10:
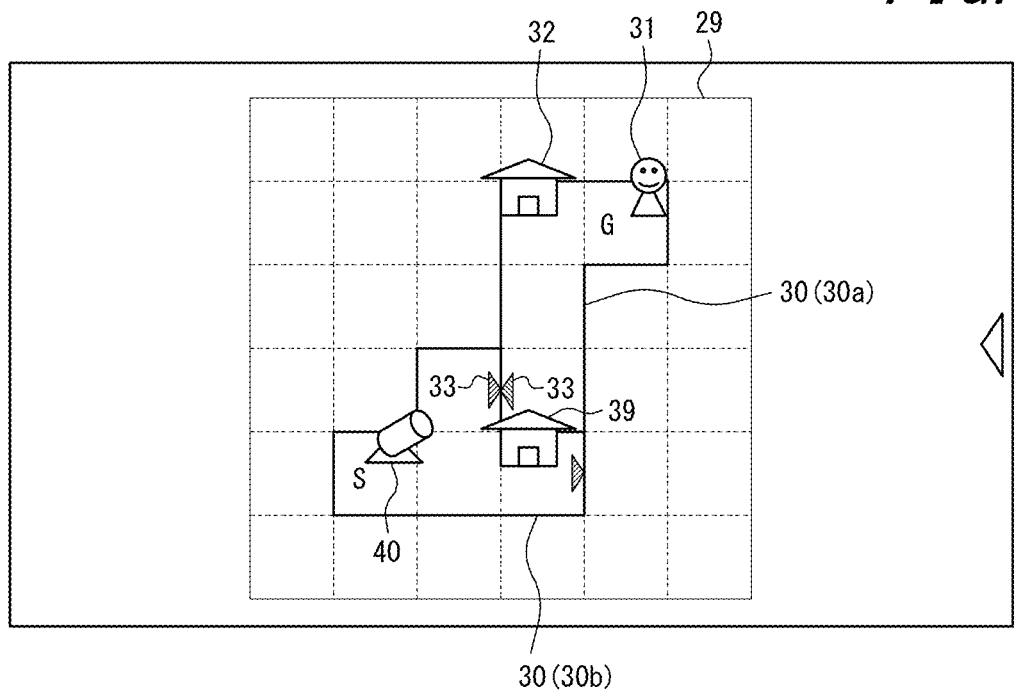
FIG. 10 illustrates an example of the first game stage screen.

Next, the terminal controller 26 switches the displaying state of the first game contents associated with the objects 30 placed in the first virtual space 29 from the second displaying state to the first displaying state. For example, as illustrated in FIG. 10, the commanding character 31 and the barracks 32, which are first game contents associated with the object 30*a*, are displayed in the first displaying state. Similarly, the barracks 39 and artillery battery 40, which are first game contents associated with the object 30*b*, are displayed in the first displaying state.

The terminal controller 26 then transmits information related to the first game contents with which the second positioning information was associated to the server 11 and ends the processing for the first game stage.

Figure 11:
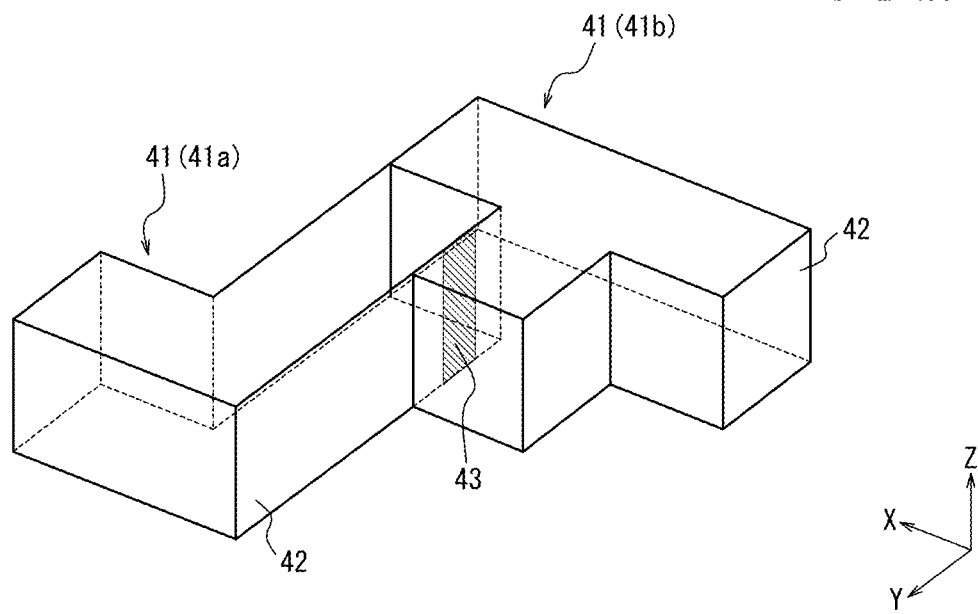
FIG. 11 illustrates an example of a second virtual space.

When, as a result of the above-described processing for the first game stage, second positioning information is associated with the first game contents associated with one or more objects 30 placed in the first virtual space 29, the second virtual space in which the first game contents are placed can be established in the below-described processing for the second game stage. For example as illustrated in FIG. 11, the second virtual space that is established includes at least areas 41 (41*a*, 41*b*) corresponding to the shape of the objects 30 (30, 30) that were placed in the first virtual space 29. In order to simplify the illustration in FIG. 11, the first game contents placed in the second virtual space are not depicted.

For example, along the Z axis in the second virtual space, when the positive direction in the Z axis is designated as pointing upward within the second virtual space and the negative direction in the Z axis is designated as pointing downward in the second virtual space, the walls 42, which are first game contents, are placed along the sides of the areas 41*a* and 41*b*. As described above, placement is restricted for walls with which the set placement restricted flag is associated. As a result, the walls 42 are for example placed on the sides of the areas 41*a* and 41*b* along the entire perimeter thereof, except for the position 43 indicated in FIG. 11. Accordingly, the areas 41*a* and 41*b* surrounded by the walls 42 are in communication at position 43. In the second game stage described below, the second game content placed in the second virtual space can move back and forth between the area 41*a* and the area 41*b* by passing through the position 43 at which no wall 42 is placed.

Processing for the Second Game Stage

Next, the processing for the second game stage is described. As described above, in the second game stage, the user operates the second game content and attempts to capture the second virtual space of another user.

In accordance with user operation to start the second game stage, the terminal controller 26 first transmits a request to start the second game stage to the server 11.

The request to start the second game stage may include information designating another user. In this case, the terminal controller 26 displays, on the display 25, a screen for example displaying information related to a plurality of other users, such as the user ID and level of the other users and the game parameters and the like of the first game contents of the other users. The terminal controller 26 then accepts user operation to select one of the other users.

When displaying the screen, the terminal controller 26 preferably sets a priority for each of the other users based on the information related to the other users and changes the displaying state of the information related to the other users based on the priority. For example, the terminal controller 26 may display the other users on the screen in order from highest to lowest priority. Alternatively, the terminal controller 26 may emphasize the display of information related to other users whose priority is at least a predetermined level, for example by changing the color of the information or causing the information to blink.

In this example, the priority is determined based on information related to the other users. For example, the terminal controller 26 may increase or decrease the priority as the other user's level is closer to the user's level. The terminal controller 26 may, for example, increase or decrease the priority as the current value of the total HP of the other user's first game contents is smaller, or as the ratio of the current value to the maximum of the total HP is smaller. This configuration provides the amusement of virtually conducting a battle in real time.

Next, the terminal controller 26 receives an instruction to start the second game stage from the server 11, which received the request to start the second game stage. Among the information, related to the other user, that is included in this instruction, the terminal controller 26 stores, in the terminal memory 24, information related to the first game contents with which the second placing information is associated.

Next, based on the information that is stored in the terminal memory 24 and is related to the first game contents, pertaining to the other user, with which the second positioning information is associated, the terminal controller 26 sets the second virtual space pertaining to the other user. Specifically, the terminal controller 26 places each first game content at a position (X, Y, Z) in the second virtual space indicated by the second placing information associated with the first game content. The second virtual space in which the first game contents are placed is thus set.

Next, the terminal controller 26 associates the second positioning information with the user's second game content and places the second game content in the second virtual space at the position indicated by the second positioning information. The position indicated by the second positioning information is, for example, a position in the second virtual space corresponding to the start position S set in the first virtual space.

Next, the terminal controller 26 displays a second game stage screen on the display 25 and starts the second game stage.

Figure 12:
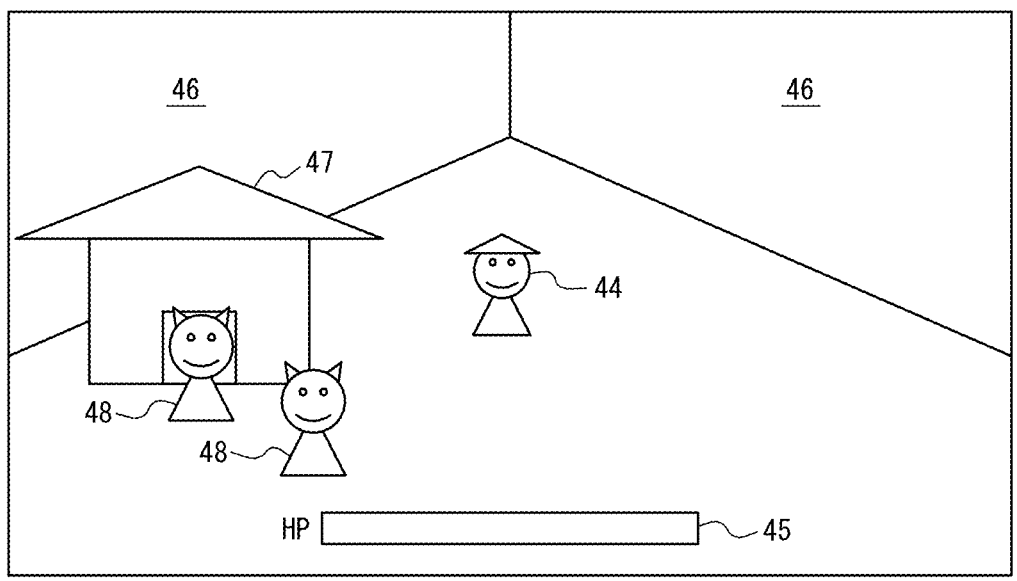
FIG. 12 illustrates an example of a second game stage screen.

With reference to the second game stage screen illustrated in FIG. 12, the following describes operations by the terminal controller 26 that conducts the second game stage. The second game stage screen is a screen displaying the area surrounding the second game content 44 in the second virtual space. FIG. 12 illustrates the second virtual space as viewed diagonally from above, i.e. from the positive direction of the Z axis, but the displaying state of the second virtual space is not limited to this example. For example, the terminal controller 26 may change the displaying state of the second virtual space (such as the perspective or scale) in accordance with a predetermined user operation on the second game stage screen (such as a pinch).

The second game content 44, an HP image 45, walls 46, barracks 47, and soldier characters 48 are displayed in the second game stage screen illustrated in FIG. 12.

The second game content 44 is for example the user's character placed in the second virtual space. As described below, the second game content 44 is operated within the second virtual space in response to a predetermined user operation on the second game stage screen.

The HP image 45 is, for example, an indicator that indicates the HP of the second game content 44.

The walls 46 are first game contents placed in the second virtual space. As described above, the walls 46 block movement of the second game content 44.

The barracks 47 are first game contents placed in the second virtual space. As described above, the barracks 47 generate third game contents, such as the soldier characters 48, in accordance with passage of time. Specifically, based on a game parameter associated with the barracks 47, such as the rate of generating soldier characters 48 (for example, once every 10 seconds), the terminal controller 26 places a soldier character 48 in the second virtual space each time a predetermined length of time (10 seconds) elapses.

The soldier characters 48 are third game contents generated by the barracks 47. The terminal controller 26 automatically operates the soldier characters 48 for example to move in the second virtual space and to attack the second game content.

Next, the terminal controller 26 starts to wait for a user operation on the second game stage screen.

Upon detecting a user operation to operate the second game content 44 in the second virtual space, the terminal controller 26 operates the second game content 44 in the second virtual space in response to the user operation. For example, in response to an operation in which the user swipes the screen while contacting a position on the screen, the second game content 44 moves in the direction of the swipe. Specifically, the terminal controller 26 changes the second positioning information of the second game content 44. As another example, in response to an operation in which the user taps a position on the screen, the second game content 44 attacks.

Next, the terminal controller 26 automatically operates the first game contents or the third game contents in the second virtual space (for example to move or attack) and holds a battle between the first game contents or the third game contents and the second game content 44.

Specifically, when an attack by a first game content or a third game content against the second game content 44 succeeds, the terminal controller 26 reduces the HP of the second game content 44. The terminal controller 26 also determines whether the HP of the second game content 44 have reached zero, i.e. whether the second game content 44 has been defeated. When determining that the second game content 44 has been defeated, the terminal controller 26 determines that the user has failed to complete the game task. Conversely, when determining that the second game content 44 has not been defeated, the terminal controller 26 continues the battle.

Specifically, when an attack by the second game content 44 against a first game content or a third game content succeeds, the terminal controller 26 reduces the HP of the first game content or the third game content. Next, the terminal controller 26 determines whether the HP of the first game content or the third game content have reached zero, i.e. whether the first game content or the third game content has been defeated. When determining that the first game content or the third game content has been defeated, i.e. when determining that the second game content has won, the terminal controller 26 for example changes the operation state and the displaying state of the first game content or the third game content to a state that indicates defeat of the first game content or the third game content. Specifically, the terminal controller 26 may remove the first game content or the third game content from the second virtual space. Alternatively, the terminal controller 26 may suspend operation of the first game content or the third game content and change to a displaying state that, for example, uses an image of destroyed barracks, an image of a fallen character, or the like. The terminal controller 26 then ends the battle and continues to conduct the second game stage. Conversely, when determining that the first game content or the third game content has not been defeated, the terminal controller 26 continues the battle.

Next, the terminal controller 26 determines whether the second game content 44 satisfies a predetermined condition in the second virtual space. The predetermined condition in this embodiment includes the condition that the second game content 44 has won in a battle with the commanding character, but the predetermined condition is not limited to this case. For example, the predetermined condition may include the condition that the second game content 44 has moved to a position in the second virtual space corresponding to the goal position G set in the first virtual space. When determining that the predetermined condition has been satisfied, the terminal controller 26 determines that the user has succeeded in completing the game task.

Next, after determining whether the game task has been completed, the terminal controller 26 transmits result information including the result of the determination to the server 11. In addition to the result of this determination, the result information may include any information that is determined by executing the second game stage, such as the time it took to complete the game task, the HP of the second game content 44 upon completion of the game task, the HP of a first game content 47 placed in the second virtual space, and the like. The terminal controller 26 then ends the processing for the second game stage.

Processing for the Third Game Stage

Next, the processing for the third game stage is described. As described above, in the third game stage, the user repairs the first game contents that were damaged in the second game stage executed by another user's terminal device 12. As a result of the second game stage, the case of a decrease in HP among the game parameters of the first game contents is described, but game parameters that change as a result of the second game stage are not limited to HP.

In accordance with user operation to start the third game stage, the terminal controller 26 first transmits a request to start the third game stage to the server 11.

Next, the terminal controller 26 receives an instruction to start the third game stage from the server 11, which received the request to start the third game stage. Among the information, related to the user, that is included in this instruction, the terminal controller 26 stores, in the terminal memory 24, information related to the first game contents with which the second placing information is associated. For example, the HP of a first game content that were reduced as a result of the second game stage executed on the other user's terminal device 12 are stored.

Next, the terminal controller 26 displays a third game stage screen on the display 25 and starts the third game stage.

Figure 13:
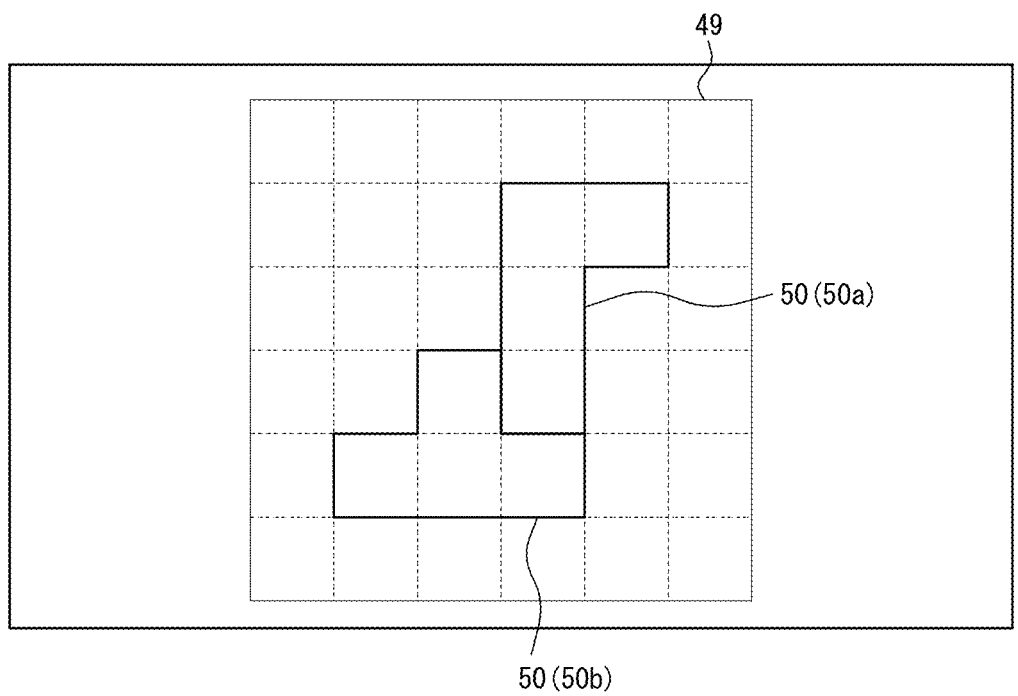
FIG. 13 illustrates an example of a third game stage screen.
Figure 14:
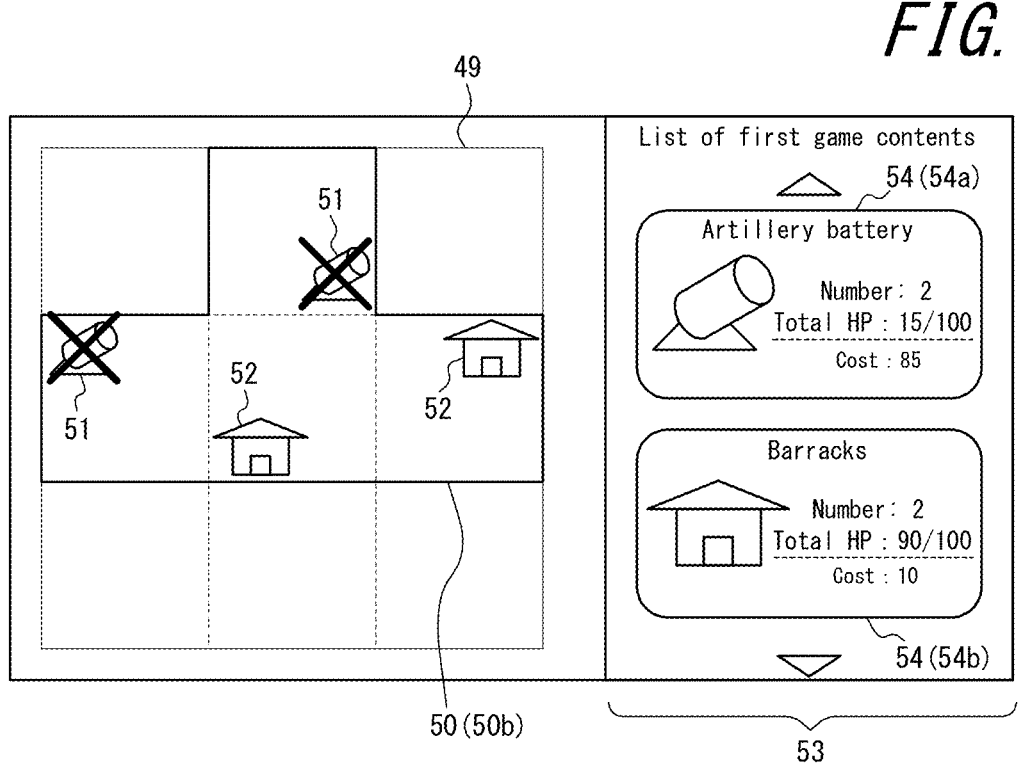
FIG. 14 illustrates an example of the third game stage screen.
Figure 15:
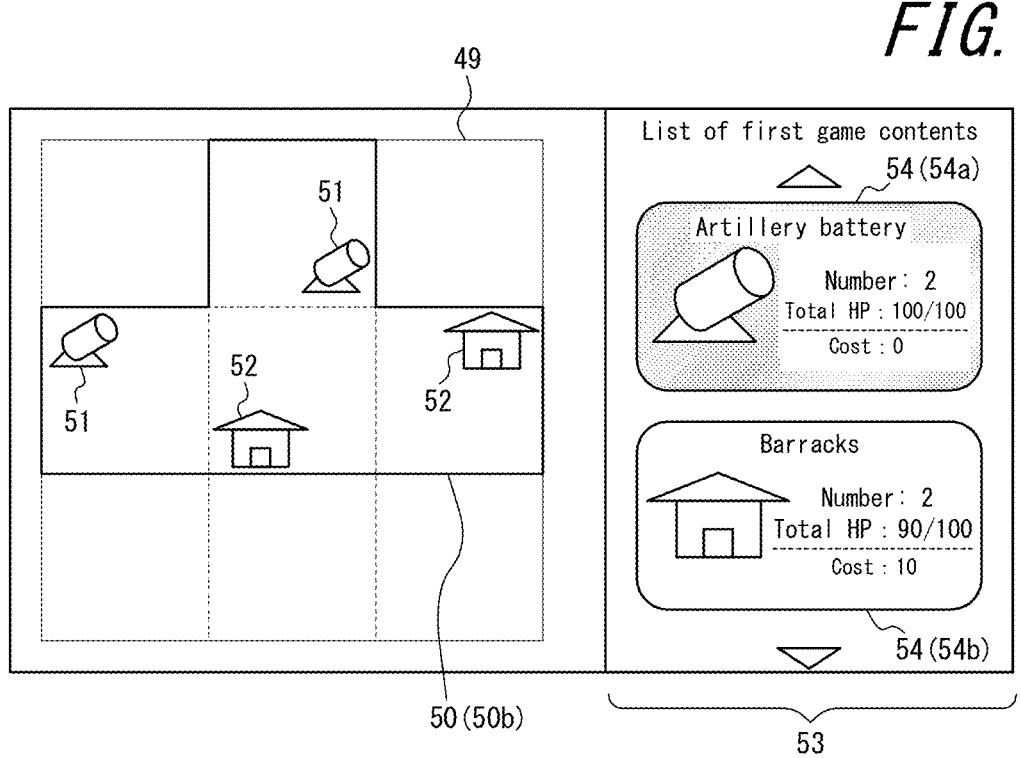
FIG. 15 illustrates an example of the third game stage screen.

With reference to the third game stage screens illustrated in FIGS. 13 to 15, the following describes operations by the terminal controller 26 that conducts the third game stage. FIG. 13 illustrates a third game stage screen that, for example, is displayed immediately after the start of the third game stage. The first virtual space 49 and one or more objects 50 (50*a*, 50*b*) placed in the first virtual space 49 are displayed on the third game stage screen.

The objects 50 (50*a*, 50*b*) on the third game stage screen function as an interface for accepting a user operation to select the objects (50*a*, 50*b*). For example, upon detecting a user operation on the object 50*b*, the terminal controller 26 is described as selecting the object 50*b*, but any number of objects 50 may be selected.

Next, the terminal controller 26 changes the displaying state of the selected object 50*b* from the usual displaying state to a detailed displaying state. In the detailed displaying state, for example as illustrated in FIG. 14, the first virtual space 49 and the object 50*b* are enlarged. The first game contents 51 and 52 associated with the object 50*b* are also displayed. In FIG. 14, two artillery batteries 51 and two barracks 52 are depicted.

The terminal controller 26 preferably changes the displaying state of the first game contents in accordance with a game parameter (for example, HP) of the first game contents. Specifically, when the HP of the first game contents are equal to or less than a predetermined threshold (for example, 50% or less of the maximum HP), the terminal controller 26 changes the displaying state of the first game contents to a different displaying state than usual. In the different displaying state than usual, for example as illustrated in FIG. 14, an X-shaped image is superimposed on the two artillery batteries 51. Any displaying state may be adopted, however, such as a state using an image of a damaged artillery battery.

Next, the terminal controller 26 displays a list 53 of first game contents on the third game stage screen. In the list 53 of first game contents, buttons 54 for first game contents corresponding to the first game contents associated with the selected object 50*b* are displayed. In this embodiment, a button 54 for a first game content (54*a*, 54*b*) is displayed for each type of first game content associated with the selected object 50*b* in the list 53 of first game contents. For example, as described above, two artillery batteries 51 and two barracks 52 are associated with the object 50*b*. In this case, for example as illustrated in FIG. 14, two buttons are displayed in the list 53 of first game contents: a button 54*a* for a first game content corresponding to the two artillery batteries 51, and a button 54*b* for a first game content corresponding to the two barracks 52.

In the button 54 for a first game content, the number of corresponding first game contents, the total of a game parameter (for example, HP), and the cost parameter are preferably displayed. As described below, the cost is a parameter indicating the number of a predetermined game content (for example, virtual currency, an item, or the like) necessary for changing the current value of a game parameter of the first game content. For example in the button 54*a* for a first game content in FIG. 14, the number (2) of artillery batteries 51 is displayed. In the button 54*a* for a first game content, the current value of the total HP of the two artillery batteries 51 (15 points) and the maximum (100 points) are also displayed. The cost (85 points) is also displayed in the button 54*a* for a first game content.

Cost is calculated based on at least one of the number and HP of first game contents. For example, the terminal controller 26 may determine the cost to be the value yielded by subtracting the current value (for example, 15 points) from the maximum (for example, 100 points) of total HP, i.e. 85 points, or may determine the cost to be the value yielded by multiplying this value (85 points) by the number of first game contents (2), i.e. 170 points. The calculation of cost is not limited to the above-described method, and any method may be adopted.

When displaying a plurality of buttons 54 for first game contents in the list 53 of first game contents, the terminal controller 26 preferably sets a priority for each button 54 for a first game content and changes the displaying state of the buttons 54 for first game contents based on the priority. For example, the terminal controller 26 may display the buttons 54 for first game contents in the list 53 of first game contents in order from highest to lowest priority. Alternatively, the terminal controller 26 may emphasize the display of buttons 54 for first game contents whose priority is at least a predetermined level, for example by changing the color of the buttons or causing the buttons to blink.

The priority is determined based on at least one of a game parameter, first placing information, and second placing information of the first game contents associated with the button 54 for a first game content. The terminal controller 26 may, for example, increase the priority as the current value of the total HP of the first game contents corresponding to the button 54 for a first game content is smaller, or as the ratio of the current value to the maximum of the total HP is smaller. The terminal controller 26 may also, for example, increase the priority as the total level, total attack strength, or total defense strength of the first game contents corresponding to the button 54 for a first game content is larger. The terminal controller 26 may also, for example, increase the priority as the position indicated by the first positioning information included in the first placing information of the first game contents corresponding to the button 54 for a first game content is closer to a predetermined position in the first virtual space 49 (for example, the start position S). The terminal controller 26 may also, for example, increase the priority as the position indicated by the second positioning information included in the second placing information of the first game contents corresponding to the button 54 for a first game content is closer to a predetermined position in the second virtual space (for example, the position in the second virtual space at which the other user's second game content is placed at the start of the second game stage executed on the other user's terminal device 12). The method of calculating the priority is not limited to the above-described method, and any method may be adopted.

According to this configuration, the burden on the user to search for the desired button 54 for a first game content within the list 53 of first game contents is reduced, and the complexity of user operations is also reduced.

The button 54 for a first game content is an interface for accepting a user operation to change game parameters of the corresponding first game contents collectively. Upon detecting a user operation on the button 54 for a first game content, the terminal controller 26 subtracts the above-described cost from the amount of a predetermined game content (for example, virtual currency) associated with the user and collectively changes the game parameters of the first game contents corresponding to the button 54 for a first game content. For example, upon detecting a user operation on the button 54*a* for a first game content illustrated in FIG. 14, the HP of the two artillery batteries 51 are for example increased to the maximum.

Alternatively, the terminal controller 26 may accept user input designating a cost. In this case, the terminal controller 26 changes the game parameters of the corresponding first game contents by an amount of change determined in correspondence with the designated cost. For example, the terminal controller 26 may increase the HP of the two artillery batteries 51 by exactly the designated cost (for example, 20 points) or may increase the HP of each of the two artillery batteries 51 by the result (+10 points) of dividing the designated cost (20 points) by the number of artillery batteries 51 (2). The calculation of the amount of change in the game parameters is not limited to the above-described method, and any method may be adopted.

The first game contents in the first virtual space 49 displayed on the third game stage screen may be used as an interface having the same function as the buttons 54 for first game contents. In this case, upon detecting a user operation on a first game content on the third game stage screen, the terminal controller 26 subtracts the cost from the amount of a predetermined game content (for example, virtual currency) associated with the user and changes the game parameter of the corresponding first game content. Upon detecting a user operation on a certain first game content on the third game stage screen, the terminal controller 26 preferably collectively changes the game parameters of all of the first game contents of the same type as the first game content for which the user operation was detected. For example, in FIG. 14, upon detecting a user operation on one artillery battery 51, the HP of the two artillery batteries 51 collectively increase.

Next, the case of a user operation on the button 54a for a first game content in FIG. 14, for example, being detected and the HP of the two artillery batteries 51 each increasing to the maximum is described. As described above, the terminal controller 26 switches display of the two artillery batteries 51 displayed in a different displaying state than usual to the usual displaying state. In the usual displaying state, for example the X-shaped image in FIG. 14 is removed, and the two artillery batteries 51 are displayed using the image of an artillery battery illustrated in FIG. 15.

Next, the terminal controller 26 suspends the acceptance of user operation on the button 54 for a first game content corresponding to the first game contents for which the total HP was increased to the maximum. The terminal controller 26 may display the button 54 for a first game content for which acceptance of the user operation was suspended in a different displaying state than usual or may hide display of the button 54 for a first game content. For example, as illustrated in FIG. 15, the terminal controller 26 displays the button 54a for a first game content corresponding to the two artillery batteries 51 for which the total HP was maximized in a darker state than usual (for example, as compared to the button 54b for a first game content in FIG. 15).

Next, upon a predetermined condition (termination condition) being satisfied, the terminal controller 26 ends the third game stage. The termination condition for example includes a condition such as detection of a predetermined user operation to end the third game stage (termination operation) or a condition such that a game parameter (for example, HP) of all of the first game contents placed in the first virtual space 49 has changed to reach a target value (for example, the maximum), but any other condition may be included.

Figure 16:
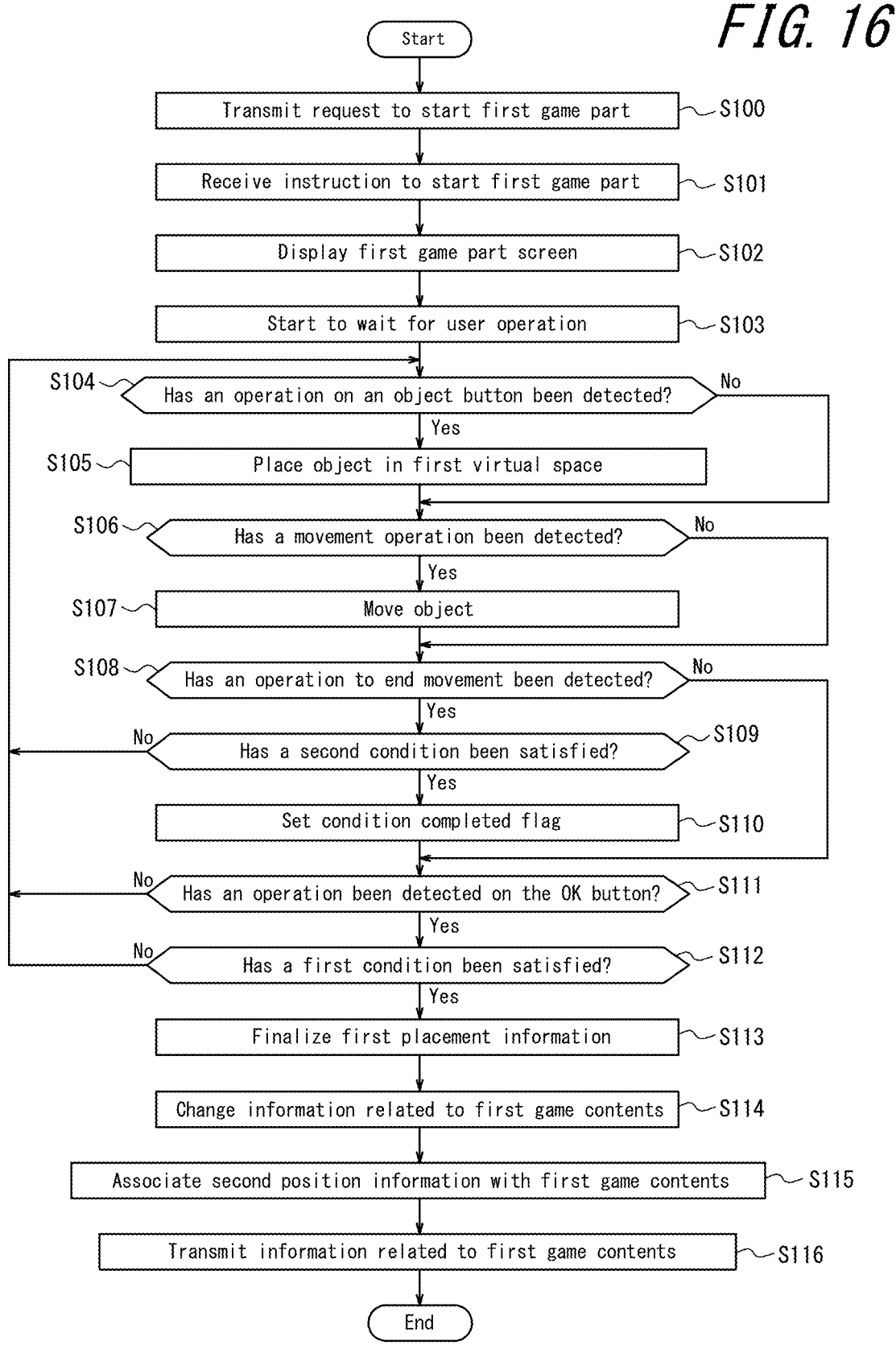
FIG. 16 is a flowchart illustrating operations of a terminal device that implements processing for the first game stage.

Next, with reference to the flowchart in FIG. 16, operations of the terminal device 12 that executes the above-described first game stage are described.

Step S100: in accordance with user operation to start the first game stage, the terminal controller 26 first transmits a request to start the first game stage to the server 11.

Step S101: next, the terminal controller 26 receives an instruction to start the first game stage from the server 11, which received the request to start the first game stage.

Step S102: next, the terminal controller 26 displays a first game stage screen on the display 25 and starts the first game stage.

Step S103: next, the terminal controller 26 starts to wait for a user operation on the first game stage screen.

Step S104: next, the terminal controller 26 determines whether a first user operation has been detected on an object button 34. When it is determined that a first user operation has been detected on an object button 34 (step S104: Yes), processing proceeds to step S105. Conversely, when it is determined that a first user operation has not been detected on an object button 34 (step S104: No), processing proceeds to step S106.

Step S105: when it is determined in step S104 that a first user operation has been detected on an object button 34 (step S104: Yes), the terminal controller 26 places an object 30 (30b) corresponding to the object button 34a in the first virtual space.

Step S106: next, the terminal controller 26 determines whether a user operation to move the object 30 placed in step S105 in the first virtual space (movement operation) has been detected. When it is determined that a movement operation has been detected (step S106: Yes), processing proceeds to step S107. Conversely, when it is determined that a movement operation has not been detected (step S106: No), processing proceeds to step S108.

Step S107: when it is determined in step S106 that a movement operation has been detected (step S106: Yes), the terminal controller 26 moves the object 30 in the first virtual space in accordance with the movement operation. In other words, the terminal controller 26 changes the first placing information associated with the object 30.

Step S108: next, the terminal controller 26 determines whether a user operation to end movement of the object 30 (operation to end movement) has been detected. When it is determined that an operation to end movement has been detected (step S108: Yes), processing proceeds to step S109. Conversely, when it is determined that an operation to end movement has not been detected (step S108: No), processing proceeds to step S111.

Step S109: when it is determined in step S108 that an operation to end movement has been detected (step S108: Yes), the terminal controller 26 determines whether a second condition has been satisfied based on information related to the object 30 placed in the first virtual space. When the second condition is determined to have been satisfied (step S109: Yes), processing proceeds to step S110. Conversely, when the second condition is determined not to have been satisfied (step S109: No), processing returns to step S104.

Step S110: when the second condition was determined in step S109 to have been satisfied (step S109: Yes), the terminal controller 26 sets the condition completed flag corresponding to the object 30.

Step S111: next, the terminal controller 26 determines whether a user operation has been detected on the OK button 38. When it is determined that a user operation has been detected on the OK button 38 (step S111: Yes), processing proceeds to step S112. Conversely, when it is determined that a user operation has not been detected on the OK button 38 (step S111: No), processing returns to step S104.

Step S112: when it is determined in step S111 that a user operation has been detected on the OK button 38 (step S111: Yes), the terminal controller 26 determines whether a first condition has been satisfied based on information related to all of the objects 30 placed in the first virtual space. When the first condition is determined to have been satisfied (step S112: Yes), processing proceeds to step S113. Conversely, when the first condition is determined not to have been satisfied (step S112: No), processing returns to step S104.

Step S113: when the first condition was determined in step S112 to have been satisfied (step S112: Yes), the terminal controller 26 finalizes the first placing information associated with all of the objects 30 placed in the virtual space and the first placing information associated with the first game contents corresponding to all of the objects 30.

Step S114: next, in accordance with the relative positional relationship in the first virtual space of two or more objects 30, the terminal controller 26 changes the information related to first game contents associated with at least one object 30 among the two or more objects 30.

Step S115: next, the terminal controller 26 associates second positioning information in the second virtual space with the first game contents respectively associated with all of the objects 30 that were placed in the first virtual space.

Step S116: the terminal controller 26 then transmits information related to the first game contents with which the second positioning information was associated to the server 11 and ends the processing for the first game stage.

Figure 17:
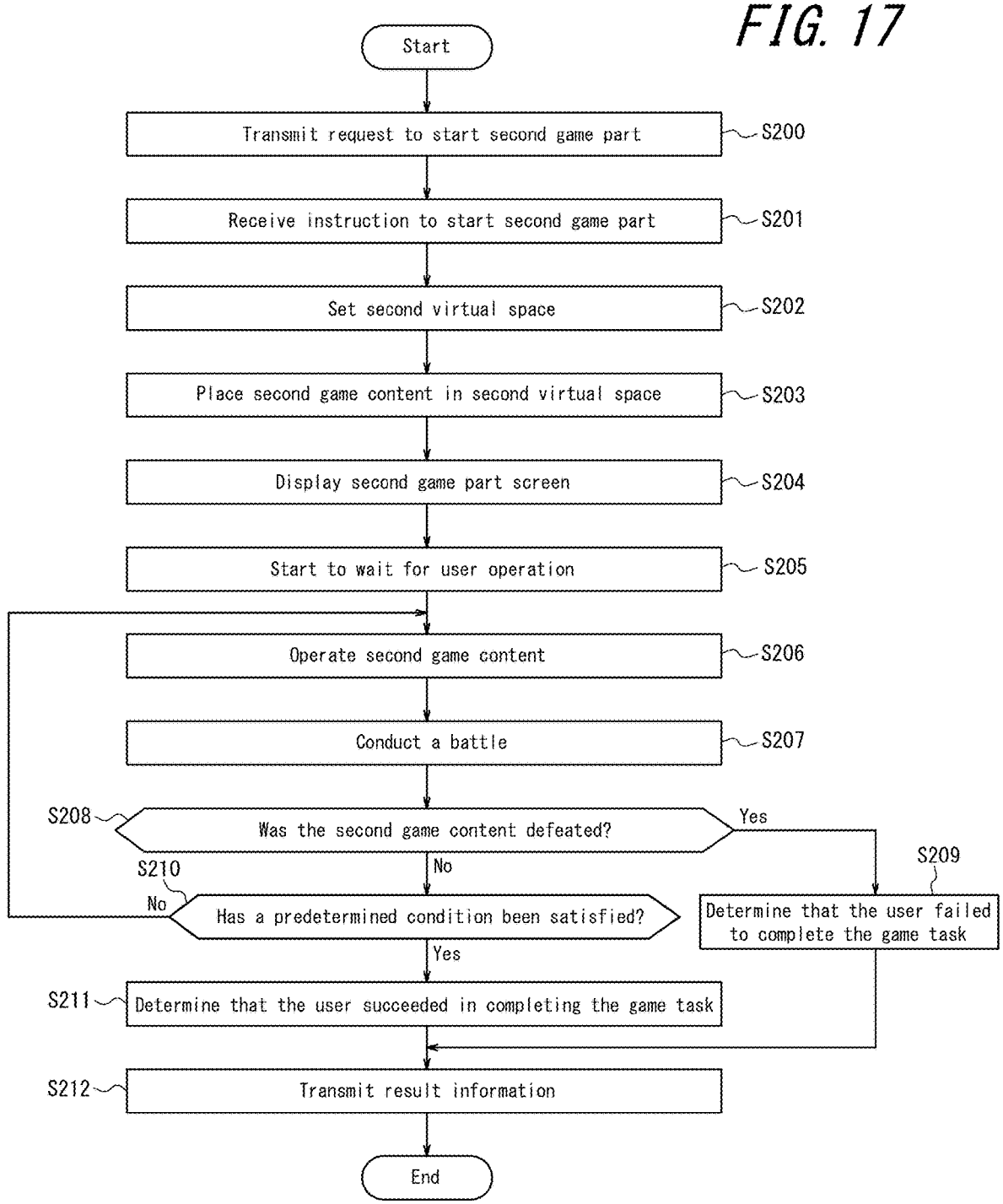
FIG. 17 is a flowchart illustrating operations of a terminal device that implements processing for the second game stage.

Next, with reference to the flowchart in FIG. 17, operations of the terminal device 12 that executes the above-described second game stage are described.

Step S200: in accordance with user operation to start the second game stage, the terminal controller 26 first transmits a request to start the second game stage to the server 11.

Step S201: next, the terminal controller 26 receives an instruction to start the second game stage from the server 11, which received the request to start the second game stage. Among the information, related to the other user, that is included in this instruction, the terminal controller 26 stores, in the terminal memory 24, information related to the first game contents with which the second placing information is associated.

Step S202: next, based on the information that is stored in the terminal memory 24 and is related to the first game contents, pertaining to the other user, with which the second positioning information is associated, the terminal controller 26 sets the second virtual space pertaining to the other user. Specifically, the terminal controller 26 places each first game content at a position (X, Y, Z) in the second virtual space indicated by the second placing information associated with the first game content.

Step S203: next, the terminal controller 26 associates the second positioning information with the user's second game content and places the second game content in the second virtual space at the position indicated by the second positioning information.

Step S204: next, the terminal controller 26 displays a second game stage screen on the display 25 and starts the second game stage.

Step S205: next, the terminal controller 26 starts to wait for a user operation on the second game stage screen.

Step S206: upon detecting a user operation to operate the second game content in the second virtual space, the terminal controller 26 operates the second game content in the second virtual space in response to the user operation.

Step S207: next, the terminal controller 26 automatically operates the first game contents or the third game contents in the second virtual space and holds a battle between the first game contents or the third game contents and the second game content.

Step S208: the terminal controller 26 determines whether the second game content was defeated. When the second game content is determined to have been defeated (step S208: Yes), processing proceeds to step S209. Conversely, when the second game content is determined to have won (step S208: No), processing proceeds to step S210.

Step S209: when it is determined in S208 that the second game content has been defeated (step S208: Yes), the terminal controller 26 determines that the user has failed to complete the game task. Processing then proceeds to step S212.

Step S210: when it is determined in step S208 that the second game content has won (step S208: No), the terminal controller 26 continues to conduct the second game stage and determines whether the second game content satisfies a predetermined condition in the second virtual space. The predetermined condition for example includes the condition that the second game content has won in a battle with the commanding character. When the predetermined condition is determined to have been satisfied (step S210: Yes), processing proceeds to step S211. Conversely, when the predetermined condition is determined not to have been satisfied (step S210: No), processing returns to step S206.

Step S211: when it is determined in step S210 that the predetermined condition has been satisfied (step S210: Yes), the terminal controller 26 determines that the user has succeeded in completing the game task.

Step S212: after determining in step S209 or step S211 whether the game task has been completed, the terminal controller 26 transmits result information including the result of the determination to the server 11.

Figure 18:
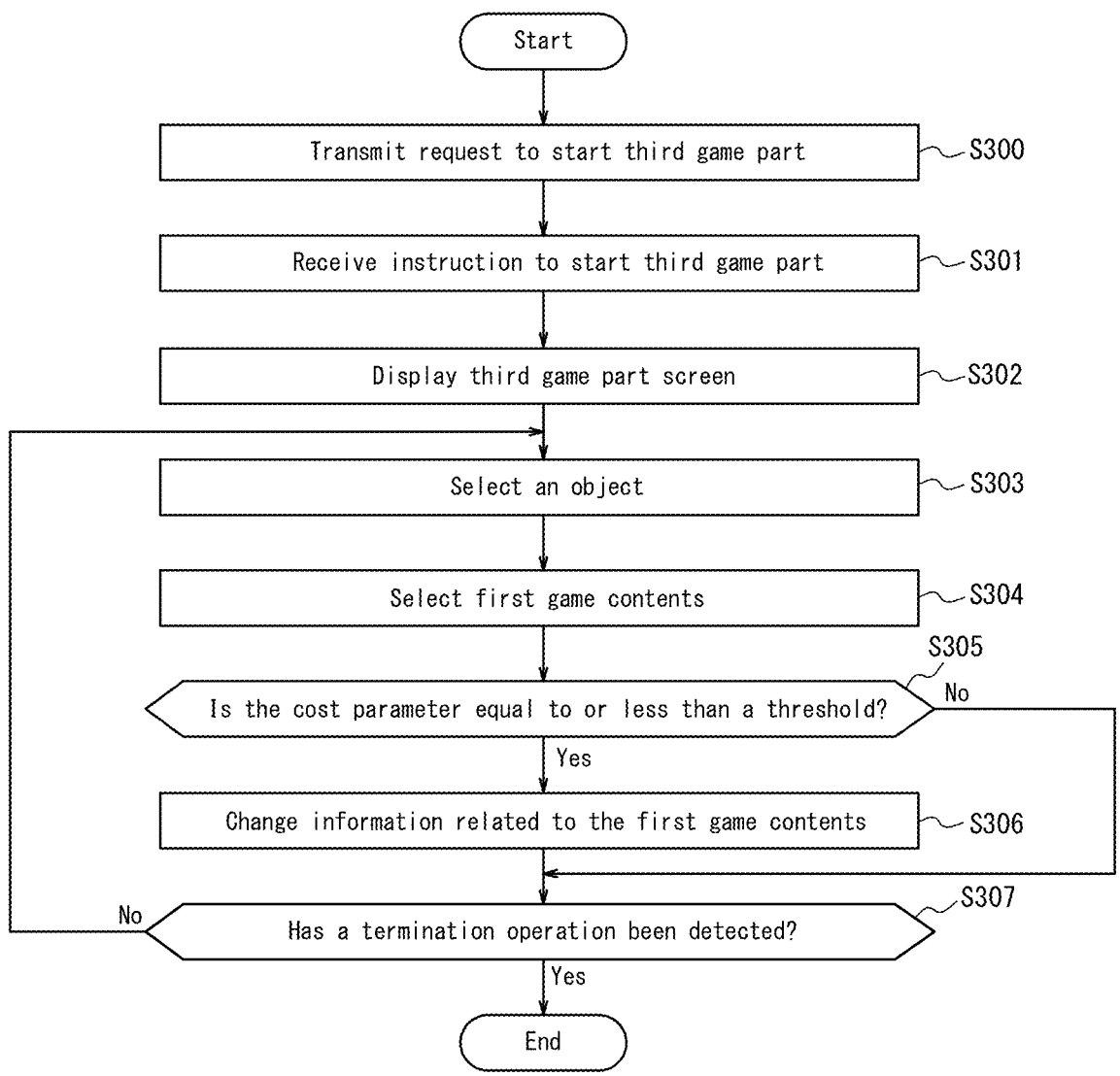
FIG. 18 is a flowchart illustrating operations of a terminal device that implements processing for the third game stage.

Next, with reference to the flowchart in FIG. 18, operations of the terminal device 12 that executes the above-described third game stage are described.

Step S300: in accordance with user operation to start the third game stage, the terminal controller 26 first transmits a request to start the third game stage to the server 11.

Step S301: next, the terminal controller 26 receives an instruction to start the third game stage from the server 11, which received the request to start the third game stage.

Step S302: next, the terminal controller 26 displays a third game stage screen on the display 25 and starts the third game stage.

Step S303: next, upon detecting a user operation on an object on the third game stage screen, the terminal controller 26 selects the object. Here, the case of selecting one object with which two or more first game contents are associated is described.

Step S304: next, the terminal controller 26 selects a plurality of first game contents from among the two or more first game contents associated with the object selected in step S303. The plurality of first game contents are, for example, first game contents of the same type. Here, the case of two artillery batteries 51 being selected in response to a user operation on the above-described button 54a for a first game content is described (see FIG. 14).

Step S305: next, the terminal controller 26 determines whether the cost corresponding to the plurality of first game contents selected in step S304 is equal to or less than a predetermined threshold. The predetermined threshold is, for example, an amount of a predetermined game content (for example, virtual currency) associated with the user. When the cost is determined to be equal to or less than the threshold (step S305: Yes), processing proceeds to step S306. Conversely, when the cost is determined to exceed the threshold (step S305: No), processing proceeds to step S307.

Step S306: when it is determined in step S305 that the cost is equal to or less than the threshold (step S305: Yes), the terminal controller 26 subtracts the cost from the amount of the predetermined game content associated with the user and collectively changes the game parameters of the plurality of first game contents selected in step S304. For example, the HP of the two artillery batteries 51 are each increased to the maximum.

Step S307: after step S306, or when it is determined in step S305 that the cost exceeds the threshold (step S305: No), the terminal controller 26 determines whether a termination condition has been satisfied. The termination condition is, for example, that a termination operation to end the third game stage has been detected. When it is determined that the termination operation has been detected (step S307: Yes), the terminal controller 26 ends the third game stage. Conversely, when the termination operation is determined not to have been detected (step S307: No), processing returns to step S303.

In this way, the terminal device 12 according to this embodiment associates first positioning information that indicates a position in the first virtual space with an object with which first game contents are associated. For each of the one or more objects with which the first positioning information is associated, the terminal device 12 associates second positioning information, indicating a position in the second virtual space, with the first game contents associated with the object. According to this configuration, the second virtual space is set for example based on objects that the user placed in the first virtual space. Therefore, for example as compared to a configuration in which predetermined first game contents are placed in the second virtual space in advance, the second virtual space can be set to reflect the user's intention, thereby making the game more amusing.

The second virtual space is set based on the objects that the user placed in the first virtual space, and therefore as compared to a configuration in which, for example, the user places a plurality of first game contents one by one in the second virtual space, the user can instead place one or more first game contents in the first virtual space object by object, thereby reducing the burden on the user and improving usability.

When determining that the second condition has been satisfied, the terminal device 12 finalizes the first positioning information associated with an object. By thus setting a condition related to finalization of object placement, the combination and placement of first game contents placed in the second virtual space can be restricted, making it easy to adjust the game balance.

In accordance with the relative positional relationship of two or more objects placed in the first virtual space, the terminal device 12 changes the information related to first game contents associated with at least one object among the two or more objects. When two or more objects are placed in the first virtual space, information related to the first game contents, such as the HP of the first game contents, thus changes in accordance with the placement. Therefore, the placement of objects in the first virtual space becomes more strategic.

In the above-described first game stage, the terminal device 12 according to this embodiment associates the first positioning information with an object in response to the first user operation. Based on the first positioning information of the object and the intra-object positioning information, the terminal device 12 automatically associates the first positioning information with each of the one or more first game contents associated with the object. According to this configuration, as compared to a configuration in which, for example, the user places one or more first game contents one by one in the first virtual space, the user can instead place one or more first game contents in the first virtual space object by object, thereby reducing the burden on the user and improving usability.

The terminal device 12 also changes the displaying state on the screen of an object with which information that does not satisfy the first condition is associated, for example an object with which are associated shape data and first placing information determined to overlap another object placed in the first virtual space. According to this configuration, the user can see at a glance which object is causing the first condition not to be satisfied, thereby improving usability.

The terminal device 12 displays one or more first game contents with which first positioning information is associated in a second displaying state indicated by a geometrical shape. According to this configuration, when the user moves an object that is in the movable state, the positional relationship between one or more first game contents indicated by a simple geometrical shape is easier to grasp than in a configuration in which, for example, first game contents placed in the first virtual space are indicated by an image with a complex shape, thereby improving usability.

The terminal device 12 identifies another object having a predetermined relative positional relationship with respect to a designated object. The terminal device 12 then changes information related to the first game contents associated with the other object. According to this configuration, when an object is placed in the first virtual space, information related to the first game contents associated with another object changes in accordance with the positional relationship between the designated object and the other object. Therefore, the placement of objects in the first virtual space becomes more strategic.

In the above-described configuration, for example a first game parameter (such as attack strength) of the first game contents associated with the other object changes (for example, increases). The terminal device 12 determines the amount of change in the first game parameter in accordance with the second game parameter (for example, HP) of the designated first game content (lieutenant character) associated with the designated object. According to this configuration, the attack strength of the first game contents changes in accordance with the HP of the designated first game content. Hence, the user is motivated to maintain the HP of the designated first game content at a desired level, thereby increasing the user's interest in the game.

In the third game stage, the terminal device 12 selects at least one object from among one or more objects placed in the first virtual space. The terminal device 12 then collectively changes information related to a plurality of first game contents among the first game contents associated with the selected object. According to this configuration, information related to a plurality of first game contents are changed together. Therefore, for example as compared to a configuration in which processing to change information related to one first game content is executed multiple times, the complexity of user operations can be eased, the processing burden can be reduced, and the processing time can be shortened.

Although this disclosure is based on drawings and examples, it is to be noted that various changes and modifications will be apparent to those skilled in the art based on this disclosure. Therefore, such changes and modifications are to be understood as included within the scope of this disclosure. For example, the functions and the like included in the various means and steps may be reordered in any logically consistent way. Furthermore, means or steps may be combined into one or divided.

For example, in the above-described embodiment, the intra-object positioning information included in the information related to the first game content has been described as being indicated by a combination of an x coordinate and a y coordinate (dx, dy) in an xyz coordinate system of the first virtual space, based on a predetermined origin set within the object, but this example is not limiting.

Specifically, the intra-object positioning information may for example be indicated by a combination of an x coordinate, a y coordinate, and a z coordinate (dx, dy, dz). In this case, the first positioning information associated with an object is (x, y, 0), and the first positioning information of the first game content associated with the object is (x+dx, y+dy, dz). Alternatively, the intra-object positioning information may be indicated by a combination of an X coordinate and a Y coordinate (dX, dY, dZ) in an XYZ coordinate system of the second virtual space, based on a predetermined origin set within the object. In this case, based on correspondence information between the first positioning information and the second positioning information, the terminal controller 26 of the terminal device 12 calculates the second positioning information (X, Y, 0) corresponding to the first positioning information (x, y, 0) associated with an object. The terminal controller 26 then adds the intra-object positioning information (dX, dY, dZ) to the calculated second positioning information (X, Y) to yield the second positioning information (X+dX, Y+dY, dZ) and associates the second positioning information with the first game content.

In the above-described embodiment, a configuration has been described in which, when a connecting position of an object has a predetermined relative positional relationship with respect to a connecting position of another object, the placement restricted flag associated with a wall placed at the connecting position in the object is set. The method of controlling the placement restricted flag is not, however, limited to this case. For example, the placement restricted flag associated with the walls placed at all of the connecting positions in an object may be set in an initial state. In this case, when the connecting position set in an object does not have a predetermined relative positional relationship with respect to a connecting position in another object, the terminal controller 26 may clear (i.e. change from on to off) the placement restricted flag associated with the wall placed at the connecting position.

In the above-described embodiment, a configuration has been described in which the placement restricted flag associated with the wall placed at a connecting position in an object can change, but a placement restricted flag of a first game content placed at a different position other than the connecting position in an object may change.

For example, when a combination of two or more objects placed in the first virtual space adopts a predetermined shape (such as a square), the terminal controller 26 may set the placement restricted flag for the walls corresponding to the two or more objects other than the walls placed along the entire perimeter of the shape formed by the combination of the two or more objects.

As another example, when a combination of two or more objects placed in the first virtual space adopts a predetermined shape (such as a square), the terminal controller 26 may set the placement restricted flag for the walls corresponding to the two or more objects other than the walls placed along the entire perimeter of the shape formed by the combination of the two or more objects based on information related to at least one first game content associated with the two or more objects, for example when a game parameter (such as attack strength) of the at least one first game content is at least a predetermined value.

According to this configuration, during the first game stage, the user can place a plurality of objects in the first virtual space without paying attention to the connecting positions set in the objects. Accordingly, even a user who is unfamiliar with the game can easily place objects, and the game balance can be maintained.

In the above-described embodiment, during execution of the first game stage, when detecting an operation to end movement that ends movement of the object 30b in the movable state, the terminal controller 26 may execute processing to resolve overlap between objects automatically if the object 30b overlaps another object 30a.

Specifically, the terminal controller 26 may automatically move the object 30a in the first virtual space to a position that does not overlap the object 30b. The terminal controller 26 preferably moves the object 30a to the position in the first virtual space at which the object 30b was placed before movement. Alternatively, the terminal controller 26 may move the object 30a so that at least one connecting position of the object 30a has a relative positional relationship with respect to at least one connecting position of the object 30b.

As another specific example, the terminal controller 26 may remove the object 30a from the first virtual space and display the object button 34 corresponding to the object 30a in the object list 28.

According to this configuration, when finalizing the placement of objects in the first virtual space, the burden on the user for taking overlap between objects into consideration is reduced, thereby increasing usability.

In the above-described embodiment, a configuration has been described in which the total cost of all of the objects placed in the first virtual space and the capacity are compared during execution of the first game stage, but the total cost of a portion of the objects placed in the first virtual space may be used instead. For example, when the first virtual space is partitioned into a plurality of areas in the xy plane as described above (see the dashed lines in FIG. 7), the first virtual space may be partitioned into a plurality of large areas each including one or more areas. For example, in the case illustrated in FIG. 7, the first virtual space 29 is partitioned into six areas by six areas, i.e. 36 areas, and is also partitioned into four large areas each composed of three areas by three areas, i.e. nine areas. In this case, the terminal controller 26 associates a capacity with each large area and stores the capacity in the terminal memory 24. Next, for each large area, the terminal controller 26 compares the total cost of objects placed in the large area and the capacity associated with the large area.

In the above-described embodiment, during execution of the first game stage, the terminal controller 26 may selectively display, in the object list 28, only the object buttons 34 corresponding to objects satisfying a predetermined condition.

For example, upon detecting a user operation that designates object A placed in the first virtual space (for example, a tap on object A displayed in the display area 27 for the first virtual space), the terminal controller 26 identifies an object, among all of the objects associated with the user, having a shape such that the designated object A can be replaced with the object (for example, a shape that does not overlap with other, already placed objects). Next, the terminal controller 26 displays the object button 34 corresponding to the identified object in the object list 28. Upon detecting a user operation on the object button 34, the terminal controller 26 then removes object A from the first virtual space and places object B at the position at which object A was placed. The terminal controller 26 may also display the object button 34 corresponding to the removed object A in the object list 28. Alternatively, instead of removing the object A, the terminal controller 26 may automatically for example move the object A in the first virtual space so as not to overlap the placed object B.

In another example, the terminal controller 26 detects a user operation to designate any position in the first virtual space 29 displayed on the first game stage screen (for example, a tap in the display area 27 for the first virtual space). Next, from among all of the objects associated with the user, the terminal controller 26 identifies an object having a shape that can be placed at the designated position (for example, a shape that does not overlap with other, already placed objects). Next, the terminal controller 26 displays the object button 34 corresponding to the identified object in the object list 28. Upon detecting a user operation on an object button 34, the terminal controller 26 places the corresponding object in the first virtual space at the designated position.

In another example, when the first virtual space is partitioned into a plurality of large areas in the xy plane as described above, the terminal controller 26 detects a user operation to designate any position in the first virtual space 29 displayed on the first game stage screen (for example, a tap in the display area 27 for the first virtual space). Next, from among all of the objects associated with the user, the terminal controller 26 identifies an object having a shape that can be placed in the large area that includes the designated position (for example, a shape that fits in the nine areas (three areas by three areas)). Next, the terminal controller 26 displays the object button 34 corresponding to the identified object in the object list 28. Upon detecting a user operation on an object button 34, the terminal controller 26 places the corresponding object in the first virtual space within the large area that includes the designated position.

According to this configuration, for example only object buttons 34 corresponding to objects that can be placed at the user designated position in the first virtual space are displayed in the object list 28. Therefore, the burden on the user to search for the desired object button 34 among multiple object buttons 34 displayed in the object list 28 is reduced, thereby increasing usability.

In the above-described embodiment, while executing the first game stage, the terminal controller 26 may automatically define (generate) a new object. For example, when the first virtual space is partitioned into a plurality of large areas in the xy plane as described above, the terminal controller 26 detects a user operation to designate any position in the first virtual space 29 displayed on the first game stage screen (for example, a tap in the display area 27 for the first virtual space). Next, the terminal controller 26 identifies the large area that includes the designated position. The terminal controller 26 then selects one or more first game contents automatically or in response to a user operation. Next, the terminal controller 26 automatically defines a new object that has a shape that can fit in the identified large area and with which the selected one or more first game contents are associated. The terminal controller 26 then stores information related to the defined object in the terminal memory 24. According to this configuration, objects have more variation as compared, for example, to a configuration in which all of the objects are defined in advance, thereby making the game more amusing.

In the above-described embodiment, while executing the first game stage, the terminal controller 26 may automatically change at least one of the shape and the direction faced by an object. For example, when the first virtual space is partitioned into a plurality of large areas in the xy plane as described above, the terminal controller 26 detects a user operation to designate any position in the first virtual space 29 displayed on the first game stage screen (for example, a tap in the display area 27 for the first virtual space). Next, the terminal controller 26 identifies the large area that includes the designated position. The terminal controller 26 then selects at least one object automatically or in response to a user operation. Next, when the selected object does not fit in the identified large area, the terminal controller 26 automatically changes the shape of the object to a shape that fits in the large area or automatically changes the direction faced by the object so that the object fits in the large area. According to this configuration, the burden on the user for taking into consideration the shape and direction faced by an object to be placed in the first virtual space is reduced, thereby increasing usability.

In the above-described embodiment, while executing the first game stage, the terminal controller 26 may store first placing information associated with at least one object, among one or more objects placed in the first virtual space, as template information in the terminal memory 24. In this case, each time the first game stage is subsequently executed, the terminal controller 26 selects template information automatically or in response to user operation. Next, based on the first placing information of each object included in the template information, the terminal controller 26 places the at least one object in the first virtual space. According to this configuration, in the first virtual space during the first game stage currently being executed, the user can for example collectively reflect the placement of one or more objects in the first virtual space during a first game stage executed in the past. Therefore, the burden of user operation to place objects in the first virtual space is reduced, thereby increasing usability.

In the above-described embodiment, a configuration has been described in which the first game contents are associated in advance with an object, but the first game contents associated with an object may be configured to be selected by a user or to be changeable to other game contents. A predetermined restriction may be placed on changing the first game contents associated with an object. Specifically, one possible configuration is to allow a first game content associated with an object to be changed to another first game content having the same attribute as the first game content or to another game content with an equal or lesser level. According to this configuration, a variety of first game contents may be associated with an object, providing objects with more variation and making the game more amusing. Furthermore, game balance can be maintained, since a predetermined restriction is placed on changing the first game contents.

In the above-described embodiment, for example a combination of one or more objects selected by the user may be determined to be one object. For example, the terminal controller 26 may automatically combine one or more objects selected by user operation and generate (define) the combination as one new object. The terminal controller 26 then stores information related to the new object in the terminal memory 24. The terminal controller 26 may select one or more objects designated by user operation or may automatically select one or more objects with which information (for example, shape or cost of the object) designated by user operation is associated.

In the above-described embodiment, a configuration has been described in which an object is placed in the xy plane at z=0 in the first virtual space, but an object may be placed at any position in the first virtual space, not only at z=0. In this configuration, for example two or more objects may be stacked along the z axis in the first virtual space.

A configuration may be adopted in which two or more objects can be stacked along the z axis only in a designated area within the first virtual space. Furthermore, a capacity may be associated with the designated area, and the terminal controller 26 may be configured to allow two or more objects to be stacked in the designated area only when the total cost of the two or more objects is equal to or less than the capacity associated with the area. First game contents that could be associated with objects stacked along the z axis for example include flying characters, airships, or the like that attack ground-based game contents from above.

As in the above-described embodiment, the terminal controller 26 may determine whether the first condition or the second condition is satisfied for objects stacked along the z axis. In this configuration, the first condition or the second condition may for example include a condition such that at least one connecting position set in each stacked object has a predetermined relative positional relationship with respect to at least one connecting position set in another object (for example, such that two connecting positions exist at approximately the same position in the first virtual space). In this case, for example the user places two or more objects so that the connecting positions of the two or more objects are at approximately the same position in the first virtual space in order to satisfy the first condition or the second condition.

In the above-described embodiment, in the third game stage, game parameters of a portion of first game contents associated with a selected object 50 have been described as being changed collectively, but a configuration may be adopted in which the game parameters of all of the first game contents associated with the selected object 50 are collectively changed. In this configuration, among the objects 50 placed in the first virtual space 49, a plurality of objects 50 with which the same object name is associated may be selected simultaneously. Specifically, upon detecting a user operation on an object 50 on the third game stage screen, the terminal controller 26 simultaneously selects all of the objects with which the same object name as the object 50 is associated. According to this configuration, game parameters of first game contents associated with a plurality of objects 50 can be changed collectively, thereby improving usability.

In the above-described embodiment, a configuration may be adopted in which, for example, the first game stage and the third game stage are integrated. In this configuration, the terminal controller 26 executes the above-described processing for the first game stage and processing for the third game stage in parallel.

In the above-described embodiment, a configuration has been described in which each user possesses second game contents, and one of the user's second game contents is used in the second game stage, but the second game content used in the second game stage is not limited to this case. For example, instead of users individually possessing game contents, a configuration may be adopted in which all of the users use common game contents in the game. In this way, the users play the game under fair conditions, regardless of the type or effectiveness of possessed game contents, thereby increasing the degree to which the user's game playing techniques contribute to the score. Users are thus encouraged to improve their game playing techniques, and users become more interested in the game.

In the above-described embodiment, a configuration has been described in which, in the first game stage, the terminal device 12 sets the condition completed flag upon the second condition being satisfied and subsequently finalizes the first placing information of the object 30 and the first game contents when the first condition is satisfied. Embodiments of this disclosure are not, however, limited to this configuration.

Figure 19:
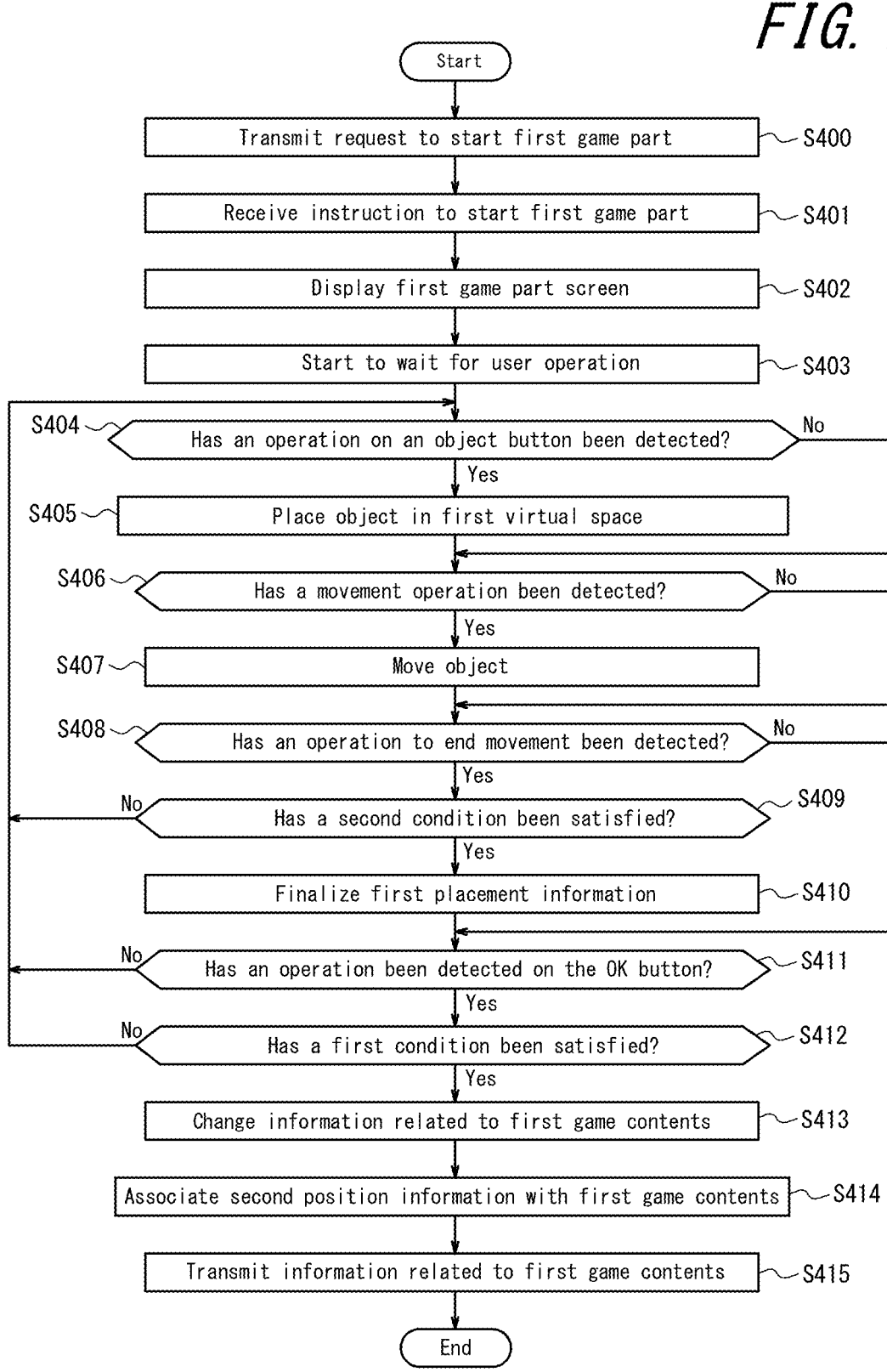
FIG. 19 is a flowchart illustrating operations of a terminal device that implements processing for the first game stage according to a modification to one of the embodiments.

For example, a configuration that does not use the condition completed flag may be adopted. Specifically, the terminal controller 26 of the terminal device 12 for example may execute steps S400 to S409 in FIG. 19. Since steps S400 to S409 are similar to steps S100 to S109 in the above-described embodiment, a description thereof is omitted.

When the second condition was determined in step S409 to have been satisfied (step S409: Yes), the terminal controller 26 finalizes placement of the object 30 (and the first game contents), i.e. finalizes the first placing information (step S410). Specifically, the terminal controller 26 sets the finalized flag corresponding to the object 30.

Next, the terminal controller 26 executes step S411. Since step S411 is similar to step S111 in the above-described embodiment, a description thereof is omitted.

When it is determined in step S411 that a user operation has been detected on the OK button 38 (step S411: Yes), the terminal controller 26 determines whether a first condition has been satisfied based on information related to all of the objects 30 placed in the first virtual space (step S412). When the first condition is determined to have been satisfied (step S412: Yes), processing proceeds to step S413. Conversely, when the first condition is determined not to have been satisfied (step S412: No), processing returns to step S404.

When the first condition is determined in step S412 to have been satisfied (step S412: Yes), the terminal controller 26 executes steps S413 to S415. Since steps S413 to S415 are similar to steps S114 to S116 in the above-described embodiment, a description thereof is omitted.

In this way, a similar processing effect can be obtained as in the above-described embodiment even with a configuration that does not use the condition completed flag.

In the above-described embodiment, the terminal device 12 may be caused to display a portion of each type of game screen by web display based on data generated by the server 11, and a portion of the game screens (for example, a header area and a footer area in which menu buttons are disposed) may be displayed by native display with a native application installed on the terminal device 12. This way, the game according to the above-described embodiment may be a hybrid game in which the server 11 and the terminal device 12 are each responsible for a portion of the processing.

An information processing device such as a computer, mobile phone, or the like may be used to function as the server 11 or the terminal device 12 according to the above-described embodiment. A program with a description of the processing for achieving the functions of the server 11 or the terminal device 12 according to an embodiment is stored in the memory of the information processing device, and the functions are achieved by the CPU of the information processing device reading and executing the program.

In the above-described embodiment, the game system 10 has been described as including the server 11 and a plurality of terminal devices 12, but the structure and functions of the server 11 may be implemented by a plurality of servers 110.

Figure 20:
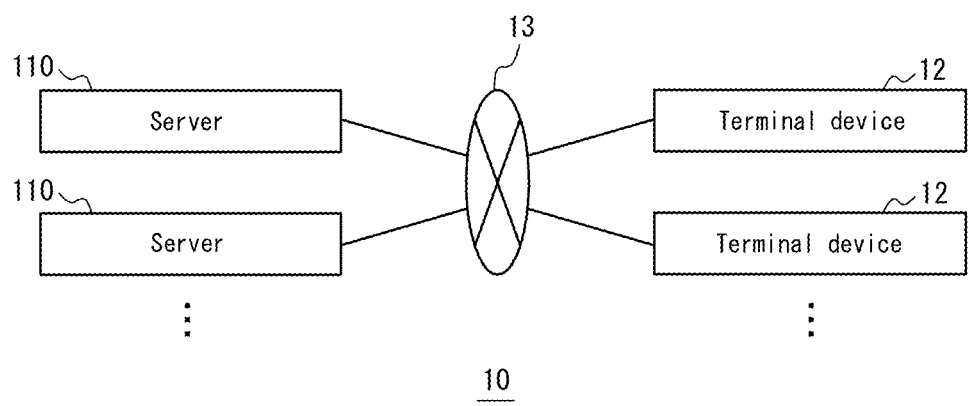
FIG. 20 is a block diagram of a game system according to a modification to one of the embodiments.

In this case, the game system 10 for example includes a plurality of servers 110 and a plurality of terminal devices 12, as illustrated in FIG. 20.

The invention claimed is:

1. One or more non-transitory computer readable media including computer program instructions, which when executed by an information processing system, cause the information processing system to implement a method comprising:
   causing an object and a game content to be displayed in a virtual space on a display, wherein
      the game content is associated to the object,
      the object is associated with first positioning information indicative of a first position in the virtual space,
      the game content is associated with
         intra-object positioning information indicative of a second position within the object, and
         second positioning information indicative of a third position in the virtual space based on the intra-object positioning information, and
      the game content is displayed in a first displaying state;
   changing the first positioning information in accordance with a first user operation;
   in response to the first positioning information being changed, automatically changing the second positioning information based on the intra-object positioning information;
   determining whether a first condition is satisfied based on information on the object;
   fixing the first positioning information and the second positioning information when the determining determines that the first condition is satisfied; and
   causing, after the first positioning information and the second positioning information are fixed, changing of a display state of the game content to a second display state that is different from the first display state.

2. The one or more non-transitory computer readable media of claim 1, wherein the intra-object positioning information is indicated by a coordinate based on an origin coordinate within the object.

3. The one or more non-transitory computer readable media of claim 1, wherein the intra-object positioning information is changeable by a user.

4. The one or more non-transitory computer readable media of claim 1, wherein
   a fourth position is set in the virtual space, and
   the first condition includes a condition that the fourth position in the virtual space is included within a region corresponding to the first positioning information.

5. The one or more non-transitory computer readable media of claim 1, wherein
   a prohibited area in the virtual space is set, and
   the first condition includes a condition that a region corresponding to the first positional information does not overlap the prohibited area in the virtual space.

6. One or more non-transitory computer readable media including computer program instructions, which when executed by an information processing system, cause the information processing system to implement a method comprising:
   causing a first object, a second object, a first game content, and a second game content to be displayed in a virtual space on a display, wherein
      the first game content is associated with the first object,
      the second game content is associated with the second object,
      the first object is associated with first positioning information indicative of a first position in the virtual space,
      the second object is associated with second positioning information indicative of a second position in the virtual space,
      the first game content is associated with
         first intra-object positioning information indicative of a third position within the first object, and
         third positioning information indicative of a fourth position in the virtual space based on the first intra-object positioning information,
      the second game content is associated with
         second intra-object positioning information indicative of a fifth position within the second object, and
         fourth positioning information indicative of a sixth position in the virtual space based on the second intra-object positioning information, and
      the first game content is displayed in a first displaying state;
   changing the first positioning information in accordance with a first user operation;
   in response to the first positioning information being changed, automatically changing the third positioning information based on the first intra-object positioning information;
   determining whether a first condition is satisfied based on information on the first object and information on the second object;
   fixing the first positioning information and the third positioning information when the determining determines that the first condition is satisfied; and
   causing, after the first positioning information and the third positioning information are fixed, changing of a display state of the first game content to a second display state that is different from the first display state.

7. The one or more non-transitory computer readable media of claim 6, wherein the method further comprises:
   causing changing, when the first condition is determined not to be satisfied, of a display state of an object among the first object and the second object which does not satisfy the first condition.

8. The one or more non-transitory computer readable media of claim 6, wherein the method further comprises:
   determining whether the second object includes a first relative positional relationship to the first object; and
   causing changing of a game parameter related to the second game content in response to the determination by the determining that the second object includes the first relative positional relationship to the first object.

9. The one or more non-transitory computer readable media of claim 8, wherein
   the first game content is associated with a first battle parameter,
   the game parameter related to the second game content includes at least a second battle parameter of the second game content, and
   the causing changing of the game parameter includes changing the second battle parameter of the second game content by a variation amount determined depending on the first battle parameter of the first game content.

10. The one or more non-transitory computer readable media of claim 6, wherein
    the causing the first object, the second object, the first game content and the second game content to be displayed in the virtual space on the display further includes causing a third object and multiple third game contents to be displayed in the virtual space on the display, the multiple third game contents are associated to the third object, the third object is associated with fifth positioning information indicative of a seventh position in the virtual space, each of the multiple third game contents is associated with
third intra-object positioning information indicative of an eighth position within the third object, and
sixth positioning information indicative of a ninth position in the virtual space based on the third intra-object positioning information, wherein the method further comprises:
selecting the third object in accordance with a second user operation; and
causing collective changing of a first game parameter related to each of the multiple third game contents.

11. The one or more non-transitory computer readable media of claim 10, wherein the collective changing of the first game parameter related to each of the multiple third game contents further includes collective changing when a cost parameter is equal to or less than a threshold, the cost parameter being calculated based on at least one of: (i) a number of the multiple third game contents, and (ii) the first game parameter.

12. The one or more non-transitory computer readable media of claim 6, wherein
a first connecting position for the first object is set within the first object,
a second connecting position for the second object is set within the second object, and
the first condition includes a condition that the first connecting position has a first relative positional relationship with respect to the second connecting position.

13. The one or more non-transitory computer readable media of claim 6, wherein
the first condition includes a condition that a first region corresponding to the first positioning information does not overlap a second region corresponding to the second positioning information.

14. The one or more non-transitory computer readable media of claim 13, wherein the method further comprises:
automatically changing the first positioning information and/or the second positioning information to resolve an overlap between the first region and the second region when the first condition is determined not to be satisfied.

15. The one or more non-transitory computer readable media of claim 6, wherein the method further comprises:
storing an arrangement position of at least one object among the first object and the second object; and
arranging the at least one object in the virtual space based on template information when the template information is selected by a user operation.

16. The one or more non-transitory computer readable media of claim 6, wherein the method further comprises making one object by combining the first object and the second object.

17. A method comprising:
causing an object and a game content to be displayed in a virtual space on a display, wherein
the game content is associated to the object,
the object is associated with first positioning information indicative of a first position in the virtual space,
the game content is associated with
intra-object positioning information indicative of a second position within the object, and
second positioning information indicative of a third position in the virtual space based on the intra-object positioning information, and
the game content is displayed in a first displaying state;
changing the first positioning information in accordance with a first user operation;
in response to the first positioning information being changed, automatically changing the second positioning information based on the intra-object positioning information;
determining whether a first condition is satisfied based on information on the object;
fixing the first positioning information and the second positioning information when the determining determines that the first condition is satisfied; and
causing, after the first positioning information and the second positioning information are fixed, changing of a display state of the game content to a second display state that is different from the first display state.

18. A method comprising:
causing a first object, a second object, a first game content, and a second game content to be displayed in a virtual space on a display, wherein
the first game content is associated with the first object,
the second game content is associated with the second object,
the first object is associated with first positioning information indicative of a first position in the virtual space,
the second object is associated with second positioning information indicative of a second position in the virtual space,
the first game content is associated with
first intra-object positioning information indicative of a third position within the first object, and
third positioning information indicative of a fourth position in the virtual space based on the first intra-object positioning information,
the second game content is associated with
second intra-object positioning information indicative of a fifth position within the second object, and
fourth positioning information indicative of a sixth position in the virtual space based on the second intra-object positioning information, and
the first game content is displayed in a first displaying state;
changing the first positioning information in accordance with a first user operation;
in response to the first positioning information being changed, automatically changing the third positioning information based on the first intra-object positioning information;
determining whether a first condition is satisfied based on information on the first object and information on the second object;
fixing the first positioning information and the third positioning information when the determining determines that the first condition is satisfied; and
causing, after the first positioning information and the third positioning information are fixed, changing of a display state of the first game content to a second display state that is different from the first display state.

19. An apparatus comprising:
processing circuitry configured to
cause an object and a game content to be displayed in a virtual space on a display, wherein
the game content is associated to the object,
the object is associated with first positioning information indicative of a first position in the virtual space,
the game content is associated with
intra-object positioning information indicative of a second position within the object, and
second positioning information indicative of a third position in the virtual space based on the intra-object positioning information, and
the game content is displayed in a first displaying state,
change the first positioning information in accordance with a first user operation,
in response to the first positioning information being changed, automatically change the second positioning information based on the intra-object positioning information,
determine whether a first condition is satisfied based on information on the object,
fix the first positioning information and the second positioning information when the determining determines that the first condition is satisfied, and
cause, after the first positioning information and the second positioning information are fixed, changing of a display state of the game content to a second display state that is different from the first display state.

20. An apparatus comprising:
processing circuitry configured to
cause a first object, a second object, a first game content, and a second game content to be displayed in a virtual space on a display, wherein
the first game content is associated with the first object,
the second game content is associated with the second object,
the first object is associated with first positioning information indicative of a first position in the virtual space,
the second object is associated with second positioning information indicative of a second position in the virtual space,
the first game content is associated with
first intra-object positioning information indicative of a third position within the first object, and
third positioning information indicative of a fourth position in the virtual space based on the first intra-object positioning information,
the second game content is associated with
second intra-object positioning information indicative of a fifth position within the second object, and
fourth positioning information indicative of a sixth position in the virtual space based on the second intra-object positioning information, and
the first game content is displayed in a first displaying state,
change the first positioning information in accordance with a first user operation,
in response to the first positioning information being changed, automatically change the third positioning information based on the first intra-object positioning information,
determine whether a first condition is satisfied based on information on the first object and information on the second object,
fix the first positioning information and the third positioning information when the determining determines that the first condition is satisfied, and
cause, after the first positioning information and the third positioning information are fixed, changing of a display state of the first game content to a second display state that is different from the first display state.

* * * * *